United States Patent
Song et al.

(10) Patent No.: US 10,163,158 B2
(45) Date of Patent: Dec. 25, 2018

(54) TRANSACTIONAL MONITORING SYSTEM

(76) Inventors: Yuh-shen Song, Northridge, CA (US);
Catherine Lew, Northridge, CA (US);
Alexander Song, Northridge, CA (US);
Victoria Song, Northridge, CA (US)

( * ) Notice: Subject to any disclaimer, the term of this patent is extended or adjusted under 35 U.S.C. 154(b) by 0 days.

(21) Appl. No.: 13/595,768

(22) Filed: Aug. 27, 2012

(65) Prior Publication Data
US 2014/0058914 A1    Feb. 27, 2014

(51) Int. Cl.
*G06Q 40/06*    (2012.01)

(52) U.S. Cl.
CPC .................................. *G06Q 40/06* (2013.01)

(58) Field of Classification Search
CPC ......... G06Q 40/06; G06Q 40/00; G06Q 40/04
USPC .......................................................... 705/35
See application file for complete search history.

(56) References Cited

U.S. PATENT DOCUMENTS

| | | | | |
|---|---|---|---|---|
| 7,801,811 | B1 * | 9/2010 | Merrell | G06Q 20/10 705/36 R |
| 8,209,246 | B2 * | 6/2012 | Lawrence | 705/35 |
| 8,412,601 | B2 * | 4/2013 | Grant et al. | 705/35 |
| 8,544,727 | B1 * | 10/2013 | Quinn | G06Q 40/00 235/379 |
| 2002/0138417 | A1 * | 9/2002 | Lawrence | 705/38 |
| 2003/0033228 | A1 * | 2/2003 | Bosworth-Davies | G06Q 20/04 705/35 |
| 2004/0024693 | A1 * | 2/2004 | Lawrence | 705/38 |
| 2004/0117316 | A1 * | 6/2004 | Gillum | G06Q 10/10 705/64 |
| 2004/0215558 | A1 * | 10/2004 | Morales | G06Q 20/00 705/39 |
| 2005/0267827 | A1 * | 12/2005 | Grant, Jr. | G06Q 40/00 705/35 |
| 2008/0021801 | A1 * | 1/2008 | Song | G06Q 40/00 705/35 |
| 2008/0086342 | A1 | 4/2008 | Curry et al. | |
| 2009/0125369 | A1 * | 5/2009 | Kloostra et al. | 705/9 |

(Continued)

FOREIGN PATENT DOCUMENTS

| | | | | |
|---|---|---|---|---|
| EP | 2138973 A1 * | 12/2009 | | G06Q 40/00 |
| WO | WO-2011068800 A1 * | 6/2011 | | G06Q 40/00 |

OTHER PUBLICATIONS

Price et al.: Case Scoring: Applying Risk to Suspicious Activity Case Management, 2008, Metavante Corporation, pp. 1-13.*

(Continued)

*Primary Examiner* — Bijendra K Shrestha
(74) *Attorney, Agent, or Firm* — Seyfarth Shaw LLP; Puya Partow-Navid

(57) ABSTRACT

A computer system conducts transactional monitoring to detect different types of possible cases in order to prevent financial crimes and assist businesses to comply with different types of laws and regulations. The computer system derives a total risk score for each of a group of entities based on risk factors. Each of the risk factors is assigned a risk score. The computer system also detects an entity when the total risk score of the detected entity differs from a reference derived from total risk scores of the group of entities by a pre-determined margin. The computer system also assists a user to identify at least one transaction that has caused the detected entity to have a total risk score that differs from the reference derived from the total risk scores of the group of entities.

17 Claims, 2 Drawing Sheets

(56) References Cited

U.S. PATENT DOCUMENTS

| | | | | |
|---|---|---|---|---|
| 2009/0182653 | A1 | 7/2009 | Zimiles | |
| 2009/0248465 | A1* | 10/2009 | Recce | G06Q 40/00 705/38 |
| 2010/0121833 | A1* | 5/2010 | Johnston | G06Q 40/00 707/706 |
| 2010/0291531 | A1* | 11/2010 | Chandler | G09B 7/02 434/433 |
| 2011/0055072 | A1 | 3/2011 | Lee et al. | |
| 2011/0055852 | A1* | 3/2011 | Smith | G06Q 40/02 719/318 |
| 2013/0036038 | A1* | 2/2013 | Nisal | G06Q 40/08 705/35 |
| 2013/0132275 | A1* | 5/2013 | Enzaldo | G06Q 40/02 705/44 |
| 2013/0211983 | A1* | 8/2013 | Lee | 705/35 |

OTHER PUBLICATIONS

Luken, David: BSA/AML Compliance: Current Issue in Identifying and Reporting Suspicious Activity, Aug. 10, 2011, Computer Services, Inc., pp. 1-34.*

Friend et al.: Standard Deviation: The New standard for out-of-pattern transaction analysis, Jan./Feb. 2009, ACAMS Today, vol. 8, No. 1, pp. 1-2.*

Friend et al.: Standard Deviation: The New standard for out-of-pattern transaction analysis, Jan./Feb. 2009, ACAMS Today, vol. 8, No. 1, pp. 1-2 (Year: 2009).*

Luken, David: BSA/AML Compliance: Current Issue in Identifying and Reporting Suspicious Activity, Aug. 10, 2011, Computer Services, Inc., pp. 1-34 (Year: 2011).*

Price et al.: Case Scoring: Applying Risk to Suspicious Activity Case Management, 2008, Metavante Corporation, pp. 1-13. (Year: 2008).*

Song, Oliver: Can You Identify True Money Launderers Among Higher-Risk Clients? 1996, GlobalVision System, Inc., pp. 1-2. (Year: 1996).*

Dharwa et al.: A Data Mining with Hybrid Approach Based Transaction Risk Score Generation Model (TRSGM) for Fraud Detection of Online Financial Transaction, Feb. 2011, International Journal of Computer Applications, vol. 6, No. 1, pp. 18-25 (Year: 2011).*

Song, Oliver: BSA Red Flags, 1996-2012, GlobalVision Systems, Inc., pp. 1-2. (Year: 2012).*

Richard H. Girgenti, Timothy P. Hedly, "Managing the Risk of Fraud and Misconduct", Japan, Nikkei Publishing Inc., Jun. 13, 2012, First Edition, pp. 67-97.

* cited by examiner

TRANSACTIONAL MONITORING SYSTEM

TECHNICAL FIELD

The present disclosure relates generally to a transactional monitoring system. More specifically, the present disclosure relates to assisting businesses in monitoring and detecting different types of suspicious activities and helping businesses comply with a variety of laws and regulations through a computer system.

BACKGROUND

The Bank Secrecy Act in the USA was first established in 1970. Under the Bank Secrecy Act, financial institutions must report suspicious activities to the government. Historically, financial institutions train frontline personnel (e.g., bank tellers) to observe and identify suspicious activities. Most financial institutions, however, could not effectively comply with the Bank Secrecy Act. After the 9/11 tragedy, U.S. lawmakers believed that true compliance with the Bank Secrecy Act by financial institutions could have prevented the 9/11 tragedy.

To further enforce the Bank Secrecy Act, the U.S. Congress passed the USA PATRIOT Act which enacted severe civil and/or criminal penalties for violations of the Bank Secrecy Act. Furthermore, the U.S. government agencies, such as Financial Crimes Enforcement Network (FinCEN), Office of Comptroller of Currency (OCC), Federal Reserve Bank (FRB), Federal Deposit Insurance Company (FDIC), National Credit Unions Administration (NCUA), State Banking Departments, Department of Financial Institutions, etc., strictly require financial institutions to comply with the Bank Secrecy Act, especially in their obligations to file Suspicious Activities Reports (SARs) to FinCEN.

Suspicious activities cover a very broad scope. For example, money laundering, terrorist financing, fraud, embezzlement, identity theft, computer intrusion, self-dealing, bribery, false statement, counterfeit instruments, mysterious disappearance, etc., are all classified as suspicious activities.

Nevertheless, many financial institutions have failed to detect and report suspicious activities. In fact, many financial institutions use products that are effective for preventing fraud, but ineffective for preventing money laundering or other financial crimes. In general, fraud can be detected based on change of behavior because a fraudster that has stolen a victim's identity (or financial instrument) behaves differently from the victim. A computer system can detect a fraud case if an account's activities are different from expected activities as derived from historical activities.

For example, U.S. application (Publication No. 2003/0177087) specifies that a high risk variable can include a change in an account's usual behavior indicated, for example, when a transaction falls outside its profile. According to this publication, Beta, Delta, and Theta models are used to detect transactions that fall outside the profile of a customer.

However, money laundering and some other financial crimes can be committed without any change in behavior. As a result, the traditional approach of detecting fraud based on a change in behavior cannot detect some basic money laundering activities or other financial crimes. In the money laundering arena, a high-risk customer may not be suspicious. For example, money services businesses (MSBs), pawn shops, ATM vendors, flight attendants, etc., are typically classified as high-risk customers by banks in their Anti-Money Laundering program. Nevertheless, it does not mean that these high-risk customers conduct money laundering activities. Although high risks are associated with these customers, there may be nothing wrong with these customers.

Some businesses are very difficult to monitor. For example, an MSB deals with a large number of transactions every day and a single money laundering transaction, mixed with a large number of transactions, may not be detected by the traditional approach.

The challenges noted for complying with the USA PATRIOT Act and the Bank Secrecy Act (BSA) are just some examples to illustrate the importance of identifying suspicious activities. Identifying suspicious activities can also be used to comply with other laws, such as the Fair and Accurate Credit Transactions Act (FACT Act), the Unlawful Internet Gambling Enforcement Act (UIGEA), the Elder Abuse Reporting Act, (EARA), the Sarbanes-Oxley Act (SOX), the regulations set by the Office of Foreign Assets Control (OFAC), and other laws and regulations.

Regulatory compliance is traditionally implemented through policies and procedures that require human workers to take some specific actions in response to certain conditions. For example, banks train their tellers in the branches to observe and report anything they see as suspicious to comply with the Bank Secrecy Act.

This traditional approach is no longer effective in the modern age because a bank's customers no longer need to appear in a branch of the bank. Customers can conduct electronic transactions remotely (e.g., ATM, Internet, etc.) and there are many financial instruments available to customers (e.g., checks, credit cards, debit cards, etc.). Furthermore, perpetrators are sophisticated and know how to avoid attracting attention from tellers. As a result, depending on tellers to detect suspicious activities for compliance with the Bank Secrecy Act is insufficient.

Moreover, the cost of this human-based approach is very expensive. Intensive training must be conducted periodically to ensure that human workers truly know how to respond to each different situation in compliance with different laws and regulations. Human workers, however, are prone to mistakes. In fact, due to human oversight, many financial institutions have received severe penalties from government agencies for failure to comply with different laws and regulations.

The present disclosure provides some solutions that can detect different types of suspicious activities and help businesses comply with different types of laws and regulations.

SUMMARY OF THE DISCLOSURE

The present disclosure introduces a comprehensive transactional monitoring system in which a computer system monitors transactions and detect suspicious activities. As a result, this computer system can help a financial institution comply with the Bank Secrecy Act.

In addition to the Bank Secrecy Act, the computer system can also help businesses comply with many other laws and regulations through transactional monitoring. Depending on the specific requirements of these laws and regulations, the computer system may monitor different types of activities by using different methods. The present disclosure provides various details of how to monitor transactions and help businesses comply with different types of laws and regulations. This computer system reduces or eliminates human efforts and mistakes, saves resources and money, and effectively achieves improved results for businesses.

In this disclosure, the terminology "network" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to accomplish the purposes of the system.

In this disclosure, the terminology "processor" generally refers to either one processor or a group of processors, which may work alone or work together to accomplish the purposes of the processor.

In this document the term "module" refers to a single component or multiple components which can be hardware, software, firmware, or a combination thereof, and may work alone or work together to accomplish the purposes of the module.

In this disclosure, a "bank" or "financial institution" generally refers to a financial service provider, either a bank or a non-bank, where financial services and money services are provided. Some examples of financial institutions are banks, credit unions, insurance companies, insurance agencies, stockbrokers, securities companies, mortgage companies, money services businesses, agencies for money services businesses, agencies for organizations that provide financial services or money services, etc.

In this disclosure, a "bank account" or "financial account" generally refers to an account associated with a financial institution, either a bank or a non-bank, where financial transactions can be conducted through financial instruments such as cash, checks, credit cards, debit cards, ATM cards, stored value cards, gift cards, pre-paid cards, wires, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, "trading" generally refers to trading activities, both private and public, including but not limited to trading of stock, currency, commodities, rights, values, securities, derivatives, goods, services, merchandise, etc.

In this disclosure, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, payer, payee, beneficiary, user, or client, etc., seeking to perform a transaction with an individual, an organization, a merchant, and/or a financial institution.

In this document, the terminology "identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, public or private organizations or other governmental authorities, and that are protected against unauthorized copying or alteration by the responsible party or parties. In particular, such "identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, and other biometrical information.

In this disclosure, "personal information" includes at least one of personal identification information, personal relationships, personal status, personal background, personal interests, and personal financial information including information related to financial instruments, financial accounts and financial activities.

In this disclosure, "financial instruments" generally refer to instruments which are used to conduct financial transactions. Examples of financial instruments include cash, credit cards, debit cards, ATM cards, prepaid cards, stored value cards, gift cards, checks, monetary instruments, wire transfers, AHC transfers, letters of credit, notes, securities, commercial papers, commodities, gold, silver, etc.

In this disclosure, a "personal communication device" generally refers to a device interface used for personal communication purposes.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, other communication device interface, a Personal Digital Assistant (PDA) interface, a handheld device interface, a portable device interface, a wireless interface, a wired interface, and other interfaces.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, smartbook, personal communication device, tablet device, digital assistant, entertainment device, network interface device, router, and/or Personal Digital Assistant (PDA), etc., which interfaces a user with a computer network, so that the user may interact with computer systems and other equipment connected to the computer network.

Reference should also be made to our co-pending applications entitled "Global Customer Identification Network" (U.S. Patent Application Publication No. 2012/0123942 to SONG et al.) and "Paperless Coupon Transactions System" (U.S. Patent Application Publication No. 2011/0225045 to SONG et al.), which are hereby expressly incorporated by reference in their entireties.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

The features, nature, and advantages of the present disclosure will become more apparent from the detailed description set forth below when taken in conjunction with the drawings.

Figure 1:
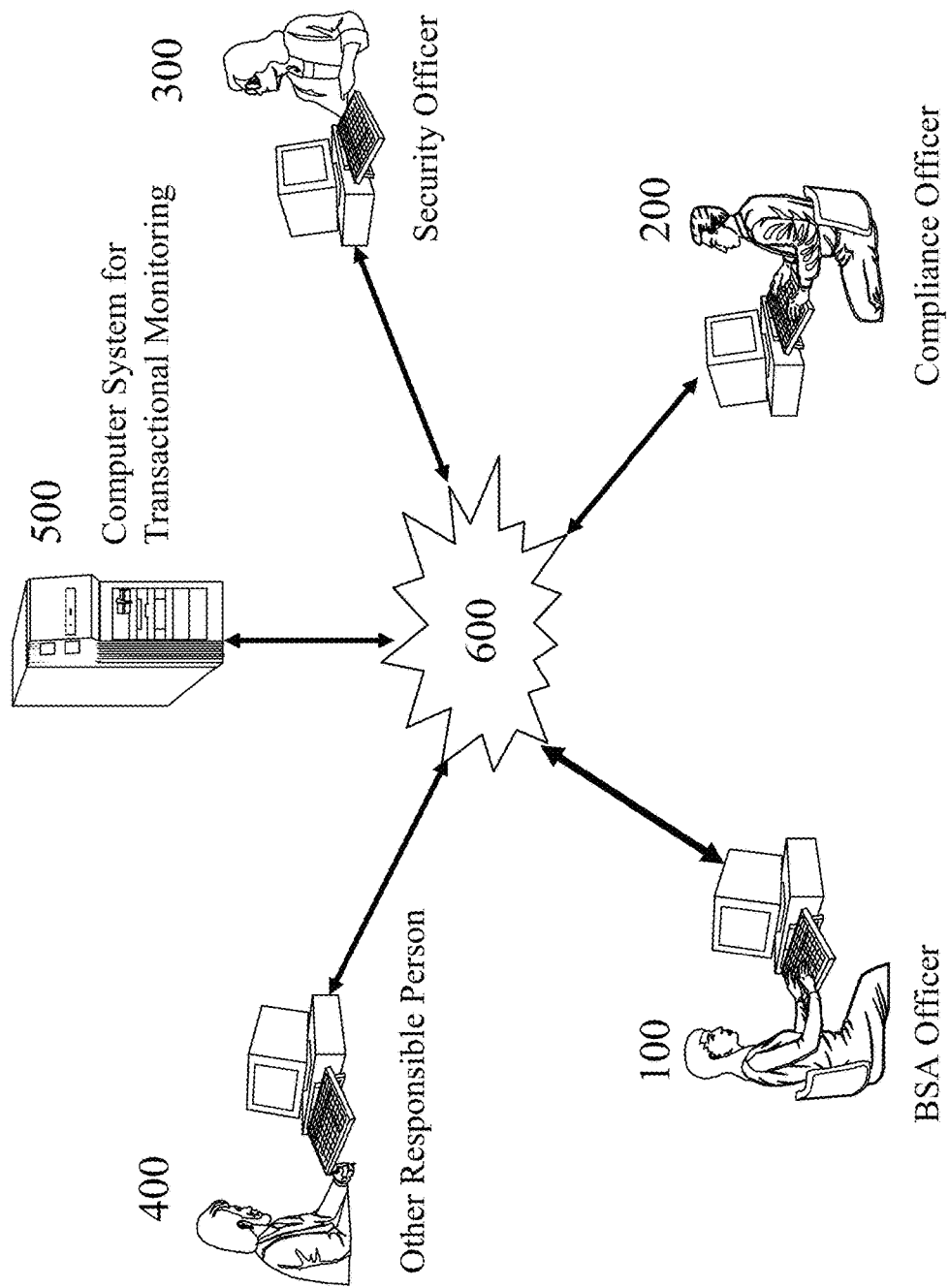
FIG. 1 illustrates a system and network diagram of a computer system for transactional monitoring to enable BSA Officer, Compliance Officer, Security Officer and/or another responsible person to comply with different types of laws and regulations.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

DETAILED DESCRIPTION

The U.S. government strictly enforces businesses, especially financial institutions (e.g., banks, credit unions, mortgage companies, money services businesses, stockbrokers, insurance companies, etc.), compliance with the USA PATRIOT Act, the Bank Secrecy Act (BSA), the Fair and Accurate Credit Transactions Act (FACT Act), the Unlawful Internet Gambling Enforcement Act (UIGEA), the Elder Abuse Reporting Act, (EARA), the Sarbanes-Oxley Act (SOX), the regulations set by the Office of Foreign Assets Control (OFAC) and other related laws and regulations. Hundreds of millions of dollars in Civil Monetary Penalties (CMPs) have already been levied by the U.S. government regulators and agencies to some financial institutions for violating these laws and regulations. Criminal penalties have also been issued to some people who work for financial institutions.

A financial institution is just one type of business. Financial institutions are not the only organizations that need to comply with these laws and regulations. Many businesses also need to comply with these laws and regulations. Financial institutions receive more pressure because they are closely regulated by government agencies. The present disclosure applies to all businesses that are obligated to comply with laws and regulations for preventing different types of crimes.

The laws and regulations in the USA are used as examples in the present disclosure. Similar laws and regulations exist in many other countries. The present disclosure is also applicable in those countries to help businesses comply with their respective laws and regulations.

Similarly, the Financial Crimes Enforcement Network (FinCEN) and the Office of Foreign Assets Control (OFAC) are USA organizations. Many other countries have similar organizations which perform similar tasks. The present disclosure can also be used to comply with the requirements of those organizations.

Very often, whether a person or a group of persons have truly conducted a suspicious activity is not clear. According to the Bank Secrecy Act in the USA, when a business files a Suspicious Activity Report (SAR) with FinCEN, the business has no obligation to prove whether the case reported by the business is a real, illegal activity. In fact, a "safe harbor" rule encourages businesses to report more suspicious activities without any concern about the ramifications of being accused of wrongfully reporting activities that are legitimate. Under this "safe harbor" rule", no person (or organization) can file any lawsuit against any entity because the entity has filed a Suspicious Activity Report (SAR) to FinCEN about this person (or organization). A SAR is used by the government to collect information, and a business is only expected to provide information and opinions in a SAR. Whether an activity reported through a SAR is truly suspicious or not is determined by government agencies based on their own investigations.

In general, the decision-making process regarding whether to report a suspicious activity (which is not fraud) is often very different from the decision-making process regarding whether to report a fraud case. For a fraud case, somebody (either a business or a consumer) may lose money and, therefore, it is typically a clear situation. Therefore, whether to report a fraud case is an easy decision. In fact, preventing fraud is also easier. In general, if a computer system detects a high fraud risk associated with a transaction, the computer system can immediately block the transaction and let an investigator investigate the transaction to determine whether it is truly a case of fraud.

In one aspect of the present disclosure, for fraud detection, a computer system calculates a risk score associated with a transaction based on many different factors associated with the transaction. For example, these factors may include historical activities of the account, deviations from the expected activities, location, time, amount, frequency and nature of the transaction, relationships between multiple accounts, type, nature and structure of the account holder, etc.

In one aspect of the present disclosure, for fraud detection, a computer system blocks the transaction if the fraud risk score of the transaction is over a threshold. The threshold can be pre-determined based on the policy of the business.

In one aspect of the present disclosure, for fraud detection, a computer system creates a case based on the detected high fraud risk transaction. The case and related information is presented to an investigator for further investigation.

In comparison, whether to report a suspicious activity (which is not fraud) is not an easy decision because there may not be any clear evidence to prove the illegality. For example, according to the Anti-money Laundering monitoring practice in a bank, when a customer frequently deposits a large amount of cash, it is possible that this customer sells drugs and receives cash as payment. It is also possible that this customer sells homemade products in farmers' markets that only accept cash as payments. Very often, due diligence is required to determine whether there is anything suspicious.

It is also possible that although a customer sells homemade products in farmers' markets, the customer also sells drugs at other locations secretly. Unless the bank has actually bought some drugs from the customer, or the customer (or somebody) has told the bank that the customer sells drugs, there is no evidence for the bank to prove that the customer sells drugs. If the customer really sells drugs and the bank does not report such suspicious activity to FinCEN, however, the bank may receive a severe penalty later for failing to report the case to FinCEN once the customer is caught by the government for selling drugs.

On the other hand, if the bank reports every case which has a slight chance of being suspicious, the bank may invite unnecessary attention from the government agencies, which may spend many months inside the bank to investigate the bank's operations and may severely affect the bank's operations.

Therefore, whether to report a case is often a judgment call by the person who reviews the case. In addition, the decision-making process can be quite subjective. Furthermore, a business cannot block a transaction simply because it appears to be a suspicious money laundering activity. A consumer may sue the business that blocks the consumer's transaction when the business cannot really prove that money laundering has occurred. In fact, many government agencies often advise businesses, which have reported suspicious activities (that are not fraud) such as money laundering or terrorist financing, to keep quiet and process the suspicious transactions as normal transactions so that the suspect will not be alerted and flee. This approach gives government agencies more time and opportunities to identify all related perpetrators.

According to the Bank Secrecy Act in the USA, a business that files a SAR has the obligation to keep the SAR confidential and cannot let the suspect (i.e., a person involved in the case) know anything about the SAR, including the existence of the SAR. SARs can only be reviewed by authorized government agencies. Even a judge cannot see the contents of a SAR when the judge knows of the existence of the SAR in his case.

Because handling a suspicious activity case is very different from handling a fraud case as described above, many traditional approaches and concepts that are applicable for fraud detection and prevention are no longer effective to detect and manage suspicious activities such as money laundering, terrorist financing, elder abuse, online gambling, etc. In one aspect of the present disclosure, a computer system records the opinions of the person that decides not to report a detected suspicious activity case. Under such circumstances, it is important to record a reason to justify why the person made the decision.

Unlike a fraud case, a suspicious activity case may not be clear to a person who reviews the case until additional evidence becomes available. Therefore, it is possible that a person may dismiss a detected suspicious activity case at the beginning, but change his mind later when the additional evidence becomes available. In one aspect of the present disclosure, a person who reviews a detected suspicious activity case may also need to review all the historical detected cases regarding the same suspect to determine whether any new evidence, when combined with the old evidence, possibly from any dismissed cases, makes the newly detected case more suspicious. As a result, even if a case was previously dismissed as false detection, such dismissed case may be reviewed again later.

This case review practice of suspicious activity is very different from the case review practice of fraud because a fraud case usually has a clear conclusion. If a customer is a fraudster, the customer's account is immediately closed and there will be no more future activities associated with the customer. If a customer is a victim of fraud, the detected fraud case has nothing to do with the customer and the evidence is not used against the customer in the future. Therefore, a fraud investigator usually only focuses on the newly detected case and makes a quick decision. Conversely, a non-fraud suspicious activity investigator may need to review a history of the detected cases and make a decision after intensive research and analyses. In one aspect of the present disclosure, the justification of the decision for not reporting a suspicious activity is stored in a database and is available for future reference.

In another aspect of the present disclosure, a computer system also records the identity of the person that decides not to report the detected case. In yet another aspect of the present disclosure, a computer system compares the decisions made by multiple persons for not reporting suspicious activities of the same suspect (or the same group of suspects) to determine whether there is any person who intends to hide a detected suspect or case.

For a large business, thousands of suspicious activities may be detected every month. A group of persons may be required to review these detected cases to determine whether the business needs to file SARs on these cases. In one aspect of the present disclosure, a computer system automatically allocates detected cases to different persons based on the policies set by the business.

In another aspect of the present disclosure, a computer system monitors and records the status of each detected case. If a case review is delayed by a particular person, the computer system will alert the business of such delay.

In yet another aspect of the present disclosure, a computer system monitors the workload of each person who reviews detected cases. If a person has reviewed an unusually large number of cases when this person is compared with other persons who also reviewed detected cases during the same period of time, this person himself may become suspicious or questionable.

On the other hand, if a person has reviewed an unusually small number of cases when this person is compared with other persons who also reviewed detected cases during the same period of time, this person himself may also become suspicious or questionable. In either of the above two situations, a manager of the business may want to investigate the situation and reach his own conclusion and resolution.

In one aspect of the present disclosure, a computer system monitors the workload of each person who reviews the detected cases. If a person has dismissed an unusually large number of cases, when compared with other persons that also reviewed detected cases during the same period of time, this person himself may become suspicious or questionable.

In another aspect of the present disclosure, if a person has dismissed an unusually small number of cases, when compared with other persons who also reviewed detected cases during the same period of time, this person himself may also become suspicious or questionable. In either of the above two situations, a manager of the business may want to investigate the situation and reach his own conclusion and resolution.

In general, many detection algorithms are used to detect suspicious activities because suspicious activities may arise in many different types of activities. Because the detection of suspicious activities is not clear, some detected cases may not be truly suspicious after investigation. Under such circumstances, such detected cases are "dismissed" as false detections or false positives. A false detection or false positive is generally referred to as the conclusion of an investigation of a case, but not the reason to justify why the case is dismissed.

For example, if a financial institution detects a case where several customers live at the same address and deposit a large amount of cash into the financial institution, this case may be about a possible drug dealer family, with many of the family members depositing their proceeds from selling drugs. After investigation, however, this case may actually be a group of students living together and depositing tips that they receive from working at a restaurant. The reason to justify the decision not to report this case should be "students living together are depositing tips they have received from part-time jobs." Then, the conclusion of the detected case becomes a "false conclusion" or "false positive" because of this reason.

In general, after the review of a detected case, the case can be classified as false detection (or false positive) by the person who reviewed this case. In one aspect the present disclosure, a computer system provides information and/or statistic for a user to analyze all detected cases that have been classified as false detections. From these false detections, the user may identify those detection algorithms that have produced an unusually large number of false detections. The user can further improve those detection algorithms to become more effective in detecting future suspicious activities.

The USA PATRIOT Act, Bank Secrecy Act (BSA), Anti-Money Laundering (AML) and Anti-Terrorist Financing (ATF) have been the most important compliance matters in the financial industry since 9/11. Many financial institutions have invested large amounts of capital in these compliance matters, but still miss true money laundering and terrorist financing cases.

The primary cause for these compliance problems is that many financial institutions do not even detect basic money laundering cases, and senior managers of financial institutions have difficulty understanding these problems. Many financial institutions utilize a fraud detection principle for detecting money laundering activities and some even mix fraud cases and money laundering cases.

In reality, however, money laundering is very different from fraud. A fraud detection product can easily compare an account holder's current activities with the account holder's historical activities and detect possible fraud if the current activities deviate from the expected activities derived from the historical activities. For example, if a fraudster steals a credit card from a victim, the fraudster will conduct purchase activities that are different from the victim's historical activities. It is just a matter of time before the credit card company will detect the fraudulent activities and disables the credit card. If a new account does not yet have sufficient historical records, a fraud detection product compares the account holder's current activities with what the account holder said during the account opening process.

Because the goal of a fraud detection product is to stop losses as soon as possible, financial institutions usually run the fraud detection or risk-scoring in real time, or at least once daily. In contrast, real-time risk scoring, real-time detection, daily risk scoring and daily detection methods that are effective for fraud detection cannot detect many basic money laundering activities. In fact, as explained earlier, a high-risk customer may not be a money launderer. It is a waste of time to assume that high-risk customers are conducting suspicious money laundering activities.

A financial institution typically has a Bank Secrecy Act Officer (BSA Officer) who is responsible for reporting suspicious money laundering or terrorist financing activities to FinCEN. The following case is an example of how BSA Officers inside financial institutions can waste a significant amount of time reviewing their real-time risk scoring or daily risk scoring results, while still missing true money laundering cases. This example consists of the following facts: (a) Client A sends less than $3,000 to XYZ around the $5^{th}$ day of each month; (b) Client B sends less than $3,000 to XYZ around the $8^{th}$ day of each month; (c) Client C sends less than $3,000 to XYZ around the $12^{th}$ day of each month; (d) Client D sends less than $3,000 to XYZ around the $17^{th}$ day of each month; (e) Client E sends less than $3,000 to XYZ around the $24^{th}$ day of each month; (f) Client F sends less than $3,000 to XYZ around the $29^{th}$ day of each month; (g) A, B, C, D, E and F are unrelated individuals; and (h) XYZ is a drug dealer in Los Angeles with no prior criminal record.

In the above example, if a BSA Officer compares a client's current activities with the client's historical activities to detect any change of behavior, the BSA Officer does not detect anything unusual because the clients have consistently conducted similar transactions each month. If the bank tellers ask the clients about the purpose of the fund transfers, the clients can easily lie. Because these clients conduct their transactions on different days throughout the month, a BSA Officer would not be able to detect any risk on any given day of the month.

Furthermore, these clients are not related, and therefore the BSA Officer would not see their aggregate activities. In addition, because each transaction only involves a small dollar amount occurring once a month and the recipient of the funds resides in a U.S. city with a large population and heavy commercial activities, none of these clients would be viewed as high-risk or suspicious based on these transactions. As a result, a fraud detection product will miss these basic money laundering cases despite the fact that the BSA Officer is working diligently with the fraud detection product every day.

To detect these money laundering cases, in one aspect of the present disclosure, a computer system collects transactional data from the financial institution and conducts data mining based on Anti-Money Laundering and Anti-Terrorist Financing scenarios across all the transactions of all clients for a period of 30 days or longer. A computer system may collect all funds transfer transactional details from different data sources, such as wire, ACH, card payments, mobile payments, etc., inside a financial institution and identifies a common recipient of these funds transfer transactions.

When a common recipient is identified, the computer system can display all transactions sent to a common recipient to the BSA Officer of the financial institution. The BSA Officer reviews the identified transactions through the computer system. The BSA Officer also reviews all historical cases associated with the suspects of the newly detected case. If the BSA Officer (i.e., a responsible person) agrees that such transactions are suspicious activities because the common recipient receives too much money, the computer system assists the BSA Officer to file a SAR to FinCEN. If the BSA Officer decides not to file a SAR, the BSA Officer enters a reason into the computer system to justify his decision for not reporting such detected activities.

As one can easily understand, data mining a huge amount of transactional data of all clients of a financial institution accumulated over a long period takes some time even for a very small financial institution. Because a financial institution will not directly lose any money in a money laundering case, according to the regulatory guidelines, a BSA Officer has up to 30 days to file a SAR. This example illustrates that it is a waste of time and resources to conduct real-time risk scoring or daily risk scoring that actually misses true money laundering activities.

In fact, many BSA Officers voice a common frustration that they are wasting time on false positives every day, at the expense of detecting actual money laundering cases. This frustration is the result of the prevailing misconception that money laundering and fraud are often crimes committed by the same offender and should be detected together based on detected change in behavior. After purchasing fraud detection products, some financial institutions try to detect both money laundering cases and fraud cases together. This has resulted in a huge amount of time, money and resources being wasted. This misconception can be corrected through a proper understanding of the sophisticated facets of transactional risks.

Transactional risks are defined as risks directly associated with the transactions. For example, money laundering risk and fraud risk are directly associated with the transactions. Nevertheless, these risks possess very different characteristics. Customers who conduct money laundering through financial institutions intend to use the financial institutions as vehicles to achieve their goals. These money launderers usually pretend to be "good customers" because they need the financial institutions' assistance to accomplish their schemes. They do not mind paying extra fees or losing interest on their money, and thus from the financial institutions' perspective, these money launderers appear to be great customers. This is one of the key reasons why financial institutions need to conduct data mining on all transactions to detect money laundering activities that are hidden behind the scene.

In comparison, fraud risks manifest themselves very differently. Fraud committed by customers is generally classified into two categories: (1) third-party fraud; and (2) counter-party fraud. Third-party fraud is defined as fraud committed by a third party that is not the financial institution and is not the customer. For example, both the financial institution (i.e., primary party) and the customer (i.e., counter party) may become victims when a fraudster (i.e., third party) steals a checkbook from the customer. Under such circumstances, the transactions conducted by the third-party fraudster have nothing to do with the customer. It is therefore a waste of time, money, and resources when BSA Officers are misled by an ineffective fraud detection product to assume that a customer has conducted money laundering (e.g., when there is a change of behavior) simply because the customer is a victim of fraud committed by a third party.

Counter-party fraud is defined as fraud committed by a customer (i.e., counter party) who cheats the financial institution (i.e., primary party). Once the customer has successfully cheated the financial institution, the customer quickly disappears and does not conduct money laundering through the financial institution. A fraudster may use financial institution A to launder the money which the fraudster has stolen from financial institution B. To financial institution B, this is a fraud case. To financial institution A, this is a money laundering case. Neither of financial institution A nor financial institution B, however, sees both the fraud case and the money laundering case occurring to this same customer. Clearly, a system that intends to detect fraud cases every day systematically creates many false positives for money laundering and actually misses the real money laundering cases. Using such an approach increases the workload of the BSA Officers and exposes the financial institution to unnecessary regulatory risk.

There are many other risks under the category of third-party fraud worth noting. For example, counterfeit checks, credit card fraud, debit card fraud, ATM fraud, online fraud, etc., are typical risks under the category of third-party fraud. Similarly, there are many different risks under the category of counter-party fraud, such as check kiting, deposit fraud, loan fraud, etc. Therefore, a good transactional risk management system uses multiple detection algorithms that intelligently take into account each unique characteristic of the various types of fraud to successfully detect fraud.

Furthermore, as explained earlier, multiple customers may launder money or finance terrorists together by conducting one small transaction for each person on different days, and daily monitoring misses such cases. This leads to the logical conclusion that a system using a single method to detect behavior changes wastes resources and misses true money laundering and terrorist financing cases. In one aspect of the present disclosure, money laundering and terrorist financing activities are detected by a different detection method which conducts data mining on all transactions of the entire financial institution accumulated over a period of time based on a user-defined scenario.

In one aspect of the disclosure, a computer system utilizes multiple detection methods for monitoring transactions and integrates the detection results into a centralized case management platform. This approach consolidates and streamlines Anti-Money Laundering, Anti-Fraud, and Anti-Financial Crimes with maximum efficiency while maintaining a holistic, accurate picture at all times. As a result, a financial institution can efficiently comply with the regulatory requirements, eliminate risks, avoid losses, boost productivity, minimize resources in managing transactional risks, reduce costs associated with hardware, database and software, lower IT maintenance workload, and increase overall profitability.

In one aspect of the present disclosure, a computer system compares a transactional pattern of a customer (or a group of customers) with some known money laundering transactional patterns to detect suspicious money laundering activities. If there is a match, a possible money laundering activity may have been detected.

For example, many perpetrators know that a bank has to file a Currency Transaction Report (CTR) to the U.S. government if more than $10,000 in cash is deposited into a bank account on the same day. To avoid the filing of CTRs, perpetrators often split one large cash deposit into multiple smaller cash deposits, each cash deposit occurring on a different day and each cash deposit being less than $10,000. This transactional pattern is a known money laundering transactional pattern and a computer system can detect this type of transactional pattern. There are many other types of transactional patterns that are known as money laundering transactional patterns. A computer system can be designed to detect each of these known money laundering transactional patterns. As a result, even if there is no change of behavior, a money laundering activity can be detected based on the transactional pattern of the suspect or suspects.

In one aspect of the present disclosure, the BSA Officer (or responsible person) investigates the detected case to determine whether it is a true money laundering case. In one aspect of the present disclosure, the BSA Officer also reviews all historical cases associated with the suspect(s) of the currently detected case. In one aspect of the present disclosure, if the BSA Officer agrees that such transactions are suspicious activities, the computer system assists the BSA Officer to file a SAR to FinCEN. In another aspect of the present disclosure, if the BSA Officer decides not to file a SAR, the BSA Officer enters a reason into the computer system to justify his decision for not reporting such detected activities.

In another aspect of the present disclosure, a group of customers who have at least one common risk factor (or characteristic), e.g., type of business, business model, organization structure, size, location, product, service, career type, position, etc., are compared together to detect suspicious money laundering activities. If a transactional activity (e.g., transactional pattern, transactional volume, transaction frequency, transaction trend, number of transactions, amount of transactions, transaction derivative, etc.) of one customer is different from the transactional activities of other customers, this customer may have conducted a suspicious money laundering activity. In one aspect of the present disclosure, statistical figures such as mean, variance, standard deviation, etc. of the group of customers are used to facilitate such comparison. Similarly, if one customer behaves differently from other customers who have the same set of risk factors (or characteristics), this customer may have conducted a suspicious money laundering activity. As a result, even if there is no change in behavior in any account, a suspicious money laundering activity can be detected.

Sometimes, it is not easy to compare a group of customers together. For example, an MSB with 100 branches may have many more cash activities than another MSB with only 2 branches. In one aspect of the present disclosure, to achieve a more effective comparison, it is useful to compare some derivatives (e.g., ratio of several numbers) instead of the original raw data. For example, a ratio can be "total cash withdrawal from a bank divided by total number of checks deposited into a bank." In this example, the number of checks deposited can be used to measure the size of the MSB's check-cashing operations. Therefore, the ratio "total cash withdrawal divided by total number of checks deposited" basically scales the check cashing operations of the 100-branch MSB and the check cashing operations of the 2-branch MSB to about the same level, based on check-cashing activities so that they can be compared on a more level ground.

Many other derivatives can be used to achieve a better comparison. In general, a derivative for a more effective comparison may include "a first variable of interest divided by a second variable which measures the size of the business (or operations)". For example, "total ACH outgoing transactional amount divided by total number of checks deposited," "total wire outgoing transactional amount divided by total number of checks deposited," "total number of prepaid cards issued divided by total number of checks deposited," "total ACH outgoing transactional amount divided by total number of branches," "total wire outgoing transactional amount divided by total number of branches," "total number of prepaid cards issued divided by total number of branches," "total ACH outgoing transactional amount divided by total number of prepaid cards issued," "total wire outgoing transactional amount divided by total number of prepaid cards issued," etc., are just some examples of the possible derivatives that can be used. In one aspect of the present disclosure, in addition to the ratios above, other forms of mathematical transformation create a derivative.

In one aspect of the present disclosure, a computer system compares a derivative of a particular customer with the derivatives of a group of customers who have at least one common risk factor (or characteristic) with the particular customer (e.g., same type of business or profession). If the derivative of the particular customer noticeably deviates from the derivatives of the group of customers, the particular customer may have conducted a suspicious money laundering activity. In one aspect of the present disclosure, statistical analysis such as mean, variance, standard deviation, etc., of the group of customers facilitate such comparison.

In one aspect of the present disclosure, a computer system uses many different risk factors to determine the money laundering risk of each customer of a financial institution. For example, these risk factors may include an industry, category of the customer, business type of the customer, geographical area of the customer, country of the address of the customer, a nature of the customer's business product types of the business, services types of the business, structure of the business, profession of the customer, nationality, historical records, type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, thousands of risk factors may be considered to determine the money laundering risk of a customer. "Risk Factors" are also referred to as "Risk Dimensions."

In one aspect of the present disclosure, each degree of the same type of risk is a risk factor and is given a risk score. For example, a total cash transactional amount in a period of 30 days can be used measure the degree of the risk associated with money laundering. For example, we can define a total cash transactional amount from $0 to $5,000 during a 30-day period to have a risk score of 10; from $5,001 to $50,000, a risk score of 50; from $50,001 to $250,000, a risk score of 100; from $250,001 to $1,000,000, a risk score of 200; from $1,000,001 to $10,000,000, a risk score of 500; and for $10,000,000 and above, a risk score of 1,000. In this example, a person with a total cash transactional amount of $60,000 during a period of 30 days has a risk score of 100.

"Cash transaction amount" is just used as an example. Other considerations, such as number of cash transactions, acceleration of cash transaction, etc., can also be used as risks associated with money laundering. In addition to cash, other financial transactions such as checks, wires, ATM, ACH, credit card, debit card, prepaid card, monetary instruments, transfer, etc., can also be used as risks associated with money laundering. Those skilled in the art can easily figure out numerous risk factors based on the above example.

In one aspect of the present disclosure, each risk factor is given a risk score and a customer is given a total risk score, which can be a summation of all risk scores of the risk factors associated with the customer. This total risk score can be used to determine the level of risk associated with the customer. A summation is used as one example in this disclosure. In fact, many different types of mathematical transformations can also be used to achieve a similar effect.

As explained earlier, unlike a fraud situation, a high-risk client may not be a suspect for money laundering or terrorist financing. High-risk may just be the nature of the client. For example, MSBs, pawn shops, car dealers, pilots, flight attendants, etc., are often classified as high-risk customers for Anti-money Laundering and Anti-Terrorist Financing purposes, however, this does not mean that these customers are conducting money laundering activities or terrorist financing.

Nevertheless, because a customer has a high risk score, the customer may be closely monitored and a different monitoring method may be applied. Therefore, in one aspect of the present disclosure, the total risk score of a customer is used to determine the monitoring method applied to monitor the customer. If a total risk score of a customer is higher, a closer monitoring method is applied to monitor the customer. If a total risk score of a customer is lower, a more relaxed monitoring method is applied to monitor the customer.

In other words, in one aspect of the present disclosure, a total risk score of a customer is not used to determine whether the customer is suspicious. Instead, a total risk score of a customer is used to select an algorithm or a set of algorithms for monitoring the customer.

In one aspect of the present disclosure, a group of customers having the same risk factor are compared together. For example, we can compare all the customers who are flight attendants together. In one aspect of the present disclosure, if the total risk score of a particular flight attendant is much higher than a reference of the total risk scores of all flight attendants in this comparison, this particular flight attendant may have conducted some suspicious money laundering activities. The reference comprises an average, a medium, a weighted average, and/or other statistic.

Statistical approaches can also be applied to facilitate the detection of suspicious activities. For example, mean, variance and standard deviation can be derived from the total risk scores of all the customers who are flight attendants. In one aspect of the present disclosure, if the total risk score of a particular flight attendant is higher than the mean of total risk scores of all flight attendants by over 4 times the standard deviation, this particular flight attendant may have conducted suspicious activities.

The above reference "4 times" is just one example. The number "4" can be any number, such as 3.75, 4.21, 10, etc. In one aspect of the present disclosure, if the total risk score of a particular flight attendant is higher than the mean of total risk scores of all flight attendants by over x times of the standard deviation, this particular flight attendant may have conducted suspicious money laundering activities, where x is a number assigned by the BSA Officer (or a responsible person). This statistical approach can be applied whenever a group comparison is used.

A flight attendant is merely one example to illustrate this method to detect suspicious money laundering activities among a group of entities. In practice, many other risk factors can be used for similar purposes. Because there are thousands of risk factors, in one aspect of the present disclosure, a computer system permits a user to select any risk factor to identify all customers who have the same risk factor. In one aspect of the present disclosure, if a particular customer has a total risk score which is much higher than a reference of the total risk scores of other customers who have the same risk factor, the particular customer may have conducted suspicious money laundering activities. The reference comprises an average, a medium, a weighted average, and/or other statistic.

Instead of one risk factor, a group of risk factors can also be used. In fact, a group of risk factors may improve the accuracy of the detection results. For example, in addition to the risk factor of profession (e.g., flight attendant), the destination country of the flight on which the flight attendant works can be another useful risk factor to detect money laundering risk. For example, a flight attendant who works on a flight between New York and Chicago may have activities which are different from the activities of another flight attendant who works on a flight between Miami and Mexico City. It may be more accurate to compare a subgroup of flight attendants who work on flights between Miami and Mexico City. In this example, two risk factors, profession and arrival/destination city of flight, are considered to improve the accuracy of detection.

In one aspect of the present disclosure, a set of risk factors is used to identify a group of entities. If a particular entity has a total risk score that is much higher than a reference of the total risk scores of all entities having the same set of risk factors, the particular entity may have conducted suspicious money laundering activities. The reference comprises an average, a medium, a weighted average, and/or other statistic. For easy comparison, group statistic such as mean, variance, standard deviation, etc., can be derived to facilitate such comparison among a group of entities. As a result, even if there is no behavior change in any account, a computer system can still detect suspicious money laundering activities based on the above approach.

Sometimes, it may be helpful to eliminate some entities from the group comparison process because such entities are very different from others. In one aspect of the present disclosure, a computer system permits users to select some entities which will not be included in a group comparison process.

Detecting a flight attendant as having a suspicious money laundering activity is just one example. A similar method can be applied to many other different situations. For example, it is usually very difficult for banks or credit unions to detect a Money Services Business (MSB) customer as having suspicious money laundering or terrorist financing activity because an MSB has many transactions every day and one money laundering transaction may be hidden among many other normal transactions.

In one aspect of the present disclosure, an additional risk factor (e.g., near Mexico border) is used to identify a group of MSBs (i.e., in addition to the first risk factor—type of business) which have this same set of risk factors. If a particular MSB has a total risk score higher than a reference of the total risk scores of all MSBs having the same set of risk factors, the particular MSB may possibly have conducted suspicious money laundering activities. The reference comprises an average, a medium, a weighted average, and/or other statistic. Similarly, group statistic such as mean, variance, standard deviation, etc. can be derived to facilitate such comparison among a group of MSBs.

Sometimes, it is not easy to compare a group of MSBs because they may have different types of operations and different sizes. In one aspect of the present disclosure, a part-time MSB and a full-time MSB are given two different risk factors because they may have different natures of business. In another aspect of the present disclosure, each of the different types of MSB products and/or services is given a risk factor. For example, each of money transfer, check cashing, currency exchange, prepaid card management, etc. is given a risk factor, although all of them can be offered by the same MSB. In one aspect of the present disclosure, a set of risk factors that precisely defines the types of products and/or services is used to identify the risks.

In one aspect of the present disclosure, some risk factors are adjusted based on the size of the operations so that a group comparison becomes more effective. For example, an MSB with 50 branches may naturally have 5 times the total cash transactional amount of another MSB with 10 branches. Sometimes, to conduct a group comparison, risk factors affected by the size of the operations may be adjusted to account for the size of the operations. For example, for an MSB with 50 branches, its total cash transactional amount in 30 days can be divided by 50 to establish an adjusted risk factor and risk score for a group comparison. Branches are used here as an example to measure the size of the operations. Other information, such as number of customers, number of transactions, number of employees, size of assets, etc. can also be used to measure the size of the operations.

In one aspect of the present disclosure, a set of risk factors which is adjusted based on the size of operations ("adjusted risk factors) are used to identify a group of entities which have this set of adjusted risk factors. The risk score of an adjusted risk factor is referred to as the adjusted risk score. If a particular entity has a total adjusted risk score that is much higher than a reference of the total risk adjusted scores of all entities having the same set of adjusted risk factors, the particular entity may have conducted suspicious money laundering activities. The reference comprises an average, a medium, a weighted average, and/or other statistic. In general, in one aspect of the present disclosure, a detection algorithm that incorporates a risk factor in the detection algorithm can also be modified to incorporate an adjusted risk factor in the detection algorithm. A detection algorithm that incorporates a risk score in the detection algorithm can also be modified to incorporate an adjusted risk score in the detection algorithm.

For easy comparison, group statistic such as mean, variance, standard deviation, etc. based on adjusted risk factors and adjusted risk scores can be derived to facilitate such comparison among a group of entities. As a result, even if there is no behavior change in any account, a computer system can still detect suspicious money laundering activities based on the above approach.

Because MSBs may have different transactional activities from other types of businesses, it is more effective to monitor MSBs based on their unique transactional activities. Therefore, in one aspect of the present disclosure, a different set of detection algorithms may be used to monitor entities with a different set of risk factors. In one aspect of the present disclosure, a set of risk factors is used to identify a group of entities that have this set of risk factors, and a particular set of detection algorithms are used to detect suspicious money laundering activities in this group of entities. From another point of view, a set of detection algorithms is selected based on a set of risk factors associated with a group of entities to monitor the group of entities.

In another aspect of the present disclosure, a set of risk factors is adjusted based on the size of operations and used to identify a group of entities that have this set of adjusted risk factors, and a particular set of detection algorithms are used to detect suspicious money laundering activities in this group of entities. From another point of view, a set of detection algorithms is selected based on a set of adjusted risk factors associated with a group of entities to monitor the group of entities.

Sometimes, it is meaningful to monitor entities with higher risks more closely than entities with lower risks. Therefore, different sets of detection algorithms are used to monitor different entities with different levels of risk. In one aspect of the present disclosure, a set of detection algorithms is selected based a total risk score of an entity to monitor the entity. In another aspect of the present disclosure, a set of detection algorithms is selected based on a total adjusted risk score of an entity to monitor the entity where the total adjusted risk score is obtained from the risk scores of adjusted risk factors.

In one aspect of the present disclosure, once an MSB is detected as having possible money laundering activities, a computer system can identify the transaction (or a group of transactions) that caused the detected MSB to have a higher total risk score than a reference of the total risk scores of all MSBs. The reference comprises an average, a medium, a weighted average, and/or other statistic. Once an MSB is detected as having possible money laundering activities, a computer system identifies the transaction (or a group of transactions) that caused the detected MSB to have a higher total adjusted risk score than a reference of the total adjusted risk scores of all MSBs. The reference comprises an average, a medium, a weighted average, and/or other statistic. As a result, a money laundering transaction (or a group of money laundering transactions) can be identified through this approach. This approach of identifying a particular transaction (or a group of transactions) with a higher risk score (or higher adjusted risk score) can be used for other types of customers, not just for MSBs.

Conventionally, a higher risk score implies a higher risk. There is no rule, however, that prohibits a person or business from defining a lower risk score for a higher risk. To avoid confusion, the description in this disclosure is based on the convention that a higher risk score means a higher risk. Furthermore, a risk score can be a negative value. A negative risk score implies a reduced risk based on this convention.

As described above, an MSB is just one example. Other types of businesses, e.g., pawn shops, car dealers, etc., can be monitored in a similar way. As a result, risk factor, risk score, adjusted risk factor, adjusted risk score, total risk score, and total adjusted risk score can be used in a variety of methods to detect suspicious money laundering activities even if there is no behavior change in any account.

In fact, a government agency such as OCC, FDIC, FRB, NCUA, FinCEN, etc., can monitor financial institutions such as banks, credit unions, insurance companies, stockbrokers, etc. based on similar approaches as described above for monitoring MSBs. Different risk factors, risk scores, adjusted risk factors and adjusted risk scores can be defined for this monitoring purpose.

In one aspect of the present disclosure, a computer system uses many different risk factors to determine whether a financial institution has complied with regulatory requirements for filing SARs for money laundering and terrorist financing cases. For example, these risk factors may include number of SARs filed for money laundering and terrorist financing cases, category of the financial institution, business type of the financial institution, geographical area of the financial institution, country of the head office of the financial institution, nature of the business of the financial institution, product types of the business, services types of the business, structure of the business, customer profile of the financial institution, historical records, type of the transactions conducted, funds inflows, funds outflows, transactional pattern, number of transactions, amount of transactions, transactional volume, transactional frequency, transactional derivatives, locations of the transaction, times of the transaction, countries of the transactions, senders of money transfer transactions, locations of the senders, countries of the senders, nature of the senders, recipients of money transfer transactions, locations of the recipients, countries of the recipients, natures of the recipients, relationships, social status of the customers, political exposure of the customers, political exposure of the senders, political exposure of the recipients, historical transactions, etc. In fact, thousands of risk factors may be considered to determine the compliance risk of a financial institution.

In one aspect of the present disclosure, the number of branches is used to adjust the risk factors and risk scores. In another aspect of the present disclosure, the asset size is used to adjust the risk factors and risk scores. Many other factors can also be used to adjust the risk factors and risk scores. In this current example, the "number of SARs filed" risk factor may have a negative value because the more SARs filed by the financial institution, the less chance that the financial institution has failed to file SARs.

In one aspect of the present disclosure, a set of risk factors is adjusted based on the size of operations and used to identify a group of banks that have this set of adjusted risk factors. If a particular bank has a total adjusted risk score that is much higher than a reference of the total adjusted risk scores of all banks having the same set of adjusted risk factors, the particular bank may have not fulfilled its compliance obligation of detecting and reporting suspicious money laundering and/or terrorist financing activities. The reference comprises an average, a medium, a weighted average, and/or other statistic. For easy comparison, group statistic such as mean, variance, standard deviation, etc. can be derived to facilitate such comparison among a group of entities.

Furthermore, different detection algorithms may be used to monitor different banks with different sets of risk factors. In one aspect of the present disclosure, a set of risk factors is used to identify a group of banks having this set of risk factors, and a particular set of detection algorithms is used to detect possible oversights in compliance matters in this group of banks. From another point of view, in one aspect of the present disclosure, a set of detection algorithms is selected based on a set of risk factors associated with a group of banks for monitoring the group of banks.

In another aspect of the present disclosure, a set of risk factors is adjusted based on the size of operations and used to identify a group of banks that have this set of adjusted risk factors, and a particular set of detection algorithms are used to detect possible oversights in compliance matters in this group of banks. From another point of view, a set of detection algorithms is selected based on a set of adjusted risk factors associated with a group of banks to monitor the group of banks.

Although banks are used in the above example, the same set of methods can be used to monitor credit unions, stockbrokers, insurance companies, other financial institutions and other types of businesses. Moreover, the monitoring scope is not limited to compliance with anti-money laundering and anti-terrorist financing matters. In fact, all types of matters of all types of businesses can be monitored by the methods described in the present disclosure by properly defining the risk factors, risk scores, adjusted risk factors, adjusted risk scores, and detection algorithms associated with such matters.

MSBs are also under pressure to comply with many laws and regulations. Unlike banks or credit unions, however, MSBs do not really know who their customers are. A typical MSB provides money services to any consumer who walks into its office. Even if the MSB collects identification information from all of its clients, an MSB may not be able to correctly identify money laundering activities. For example, it is possible that one consumer uses his Mexican Passport to conduct one money transfer transaction of $7,000 by paying an MSB cash in the morning, and uses his California driver license to conduct another money transfer transaction of $8,000 by paying the same MSB cash in the afternoon. Because two Identification documents are used, this same consumer may be viewed as two different persons. The MSB may fail to file a Currency Transaction Report as required by law because more than $10,000 cash has been provided by the same consumer. If the MSB has multiple branches, this situation becomes even more complicated because the same consumer can walk into different branches to conduct transactions based on different identification documents.

In one aspect of the present disclosure, a computer system compares the name, phone number, address, date of birth, etc. of all consumers who conducted transactions with an MSB to identify all transactions that may be conducted by the same consumer. After all transactions associated with a consumer have been identified, a computer system can detect suspicious money laundering activities associated with the consumer based on the transactions associated with the consumer.

In one aspect of the present disclosure, a BSA Officer (i.e., a responsible person) investigates the detected case to determine whether it is a true money laundering case The BSA Officer also reviews all historical cases associated with the consumer of the newly detected case. If the BSA Officer agrees that the detected case is a suspicious money laundering case, the computer system assists the BSA Officer to file a SAR with FinCEN. If the BSA Officer decides not to file a SAR, the BSA Officer enters a reason into the computer system to justify his decision for not reporting the detected case.

Sometimes, a bank receives a wire transfer from a client of corresponding bank A and resends the wire transfer to another client of corresponding bank B because corresponding bank A and corresponding bank B do not have a direct banking relationship. This situation often arises during international wire transfers because banks in two different countries may not have a direct banking relationship. This type of wire transfer is often referred to as intermediary wire transfer.

A bank that provides intermediary wire transfer services is exposed to a very high money laundering risk because senders and recipients of intermediary wire transfers are not customers of the bank. In addition, the bank may not know the real background of the senders and the recipients of the wire transfers. It is possible that a sender is a terrorist financier and a recipient is the terrorist. A bank that handles intermediary wire services may unknowingly become a channel for money laundering and terrorist financing.

In one configuration of the present disclosure, a computer system compares names, addresses, countries, phone numbers, email addresses, etc. of all senders and recipients of intermediary wire transfers and identifies the transactions associated with each sender and each recipient. In one aspect of the present disclosure, if the computer system detects an unusually large number of wire transfers from the same sender, the sender and the recipients may be involved in money laundering or terrorist financing activities. If the computer system detects an unusually large aggregate amount of wire transfers from the same sender, the sender and the recipients may be involved in money laundering activities.

Similarly, if the computer system detects an unusually large number of wire transfers to the same recipient, the senders and the recipient may be involved in money laundering or terrorist financing activities. If the computer system detects an unusually large aggregate amount of wire transfers to the same recipient, the senders and the recipient may be involved in money laundering activities.

If the computer system detects that an unusual number of wire transfers are sent from the same sender to the same recipient, the sender and the recipient may be involved in money laundering or terrorist financing activities. If the computer system detects that an unusual aggregate amount of wire transfers are sent from the same sender to the same recipient, the sender and the recipient may be involved in money laundering or terrorist financing activities.

In one aspect of the present disclosure, a BSA Officer (i.e., a responsible person) investigates such a detected case to determine whether it is a true money laundering case. The BSA Officer also reviews all historical cases associated with the suspects of the newly detected case. If the BSA Officer agrees that there is suspicious money laundering activity, the computer system assists the BSA Officer to file a SAR to the FinCEN. If the BSA Officer decides not to file a SAR, the BSA Officer enters a reason into the computer system to justify his decision for not reporting such detected activities.

As a large percentage of the population is quickly aging, the Elder Abuse Reporting Act (EARA) was recently established in some states to protect elders who are unable to protect themselves. Very often, an elderly person may give money to a perpetrator because the elderly person is cheated by the perpetrator. Therefore, financial institutions are training frontline personnel to observe and report what they see as possible elder abuse cases. This human-based approach is not effective because transactions can be performed remotely and perpetrators can skillfully cover up their activities. Moreover, human workers are susceptible to errors and mistakes. It is ineffective to depend on human workers to detect and report elder abuse cases.

For many businesses, the date of birth information of their customers is stored inside a database. In one aspect of the present disclosure, a computer system collects the date of birth information and identifies elderly persons who are older than a pre-defined age. A computer system monitors the transactions of all elderly persons and detects any change in the activities of these elderly persons.

For example, if an unusually large amount of funds are sent out from an account of an elderly person, the financial institution may want to investigate the purpose of the funds transfer. In one aspect of the present disclosure, if a check with an unusually large amount is deposited into an account of an elderly person, the financial institution may want to investigate whether a fake check was given to the elderly person in exchange for his/her real money or assets. If there is an unusual transactional pattern, (e.g., unusual frequency or volume) in the account of an elderly person, the financial institution may want to investigate the transaction(s). If the account balance of an elderly person is decreasing rapidly, the financial institution may want to investigate the transactions associated with this account.

In one aspect of the present disclosure, risk factors, risk scores, adjusted risk factors, adjusted risk scores, total risk scores, total adjusted risk score, statistical approach, and the methods to select detection algorithms described earlier can be applied to detect possible elder abuse cases. Because elder abuse is different from money laundering, a different set of risk factors and risk scores may be used for elder abuse detection. For example, these risk factors may include age of the person, sex of the person, income level of the person, appearance of the person, judgment about the person, personal conditions of the person, family conditions of the person, family members of the person, family members' conditions of the person, friends of the person, friends' conditions of the persons, historical records of the person, industry category of the person, geographical area of the person, country of the address of the person, profession of the person, nationality, type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, many different risk factors may be considered to determine the elder abuse risk of a person.

For example, in one aspect of the present disclosure, a risk factor is used to identify a group of elderly persons having the same risk factor. If a particular elderly person has a total risk score higher than a reference of the total risk scores of all elderly persons having the same risk factor, the particular elderly person may become a victim of a potential elder abuse case. The reference comprises an average, a medium, a weighted average, and/or other statistic. In another aspect of the present disclosure, a set of risk factors is used to identify a group of elderly persons who have this set of risk factors. If a particular elderly person has a total risk score higher than a reference of the total risk scores of all elderly persons having the same set of risk factors, the particular elderly person may become a victim of a potential elder abuse case. The reference comprises an average, a medium, a weighted average, and/or other statistic.

For easy comparison, group statistic such as mean, variance, standard deviation, etc. can be derived to facilitate such comparison among a group of entities. As a result, even if there is no behavior change in an account, a computer system can still detect a possible elder abuse case based on the above approach.

Very often, a business may have a Compliance Officer that is responsible for all regulatory compliance matters. In one aspect of the present disclosure, a responsible person (e.g., a Compliance Officer) investigates detected cases to determine whether true elder abuse cases have occurred. The Compliance Officer also reviews all historical cases associated with the elderly person of the newly detected case. If the Compliance Officer agrees that the case is a possible elder abuse case, the computer system assists the Compliance Officer in reporting the detected case. If the Compliance Officer decides not to report the detected case, the Compliance Officer enters a reason into the computer system to justify his decision for not reporting the detected case.

According to the Sarbanes-Oxley Act (SOX), certain companies (e.g., publicly listed companies) have to conduct internal control monitoring to prevent fraud committed by employees. Traditionally, such internal control monitoring is performed by human workers (e.g., auditors) that spend several months each year auditing the financial records of a business. Such a human-based approach is not effective because human workers are prone to errors and mistakes. Furthermore, because it takes a substantial amount of time to audit financial records, it may be too late to prevent a crime.

In one aspect of the present disclosure, a computer system monitors accounting general ledger items and detects any unusual patterns (e.g., unusual frequency, volume, acceleration, etc.) related to the general ledger items to identify suspicious internal fraud activities. For example, if a traveling expense general ledger item has suddenly grown by 500% this month when it is compared with the past twelve-month history, some employees may have abused their rights and caused the unusual expenses.

In one aspect of the present disclosure, a computer system compares the current value of an accounting general ledger item with a reference of the historical values of the same accounting general ledger item for the past x months, where the value x is predefined. If the current value is larger than a reference of the historical values by a noticeable margin, some employee may have committed fraud. The reference comprises an average, a medium, a weighted average, and/or other statistic. Further investigation can be conducted to determine why the general ledger item value has deviated from its historical values.

In another aspect of the present disclosure, a computer system compares an employee's current activities with his historical activities to detect any change. For example, if a loan officer has issued an unusually larger number of loans in comparison to historical numbers, this loan officer's activities may be suspicious. If a loan officer has issued a loan with an loan amount unusually larger than the historical amounts, this loan officer's activities may be suspicious. If a loan officer has issued an unusual larger aggregate amount of loans compared to the historical aggregate amounts, this loan officer's activities may be suspicious.

Very often, an activity can be measured by a value referred to as an activity value. For example, a loan officer's activities can be measured by the number of loans, largest amount of loan, aggregate amount of loans, average amount per loan, number of loans to the same customer, number of changes on loan records, number of changes on loan records with the same customer, frequency of changes on loan records, frequency of changes on loan records with the same customer, types of loans, etc. A bank teller's activities can be measured by the total number of transactions, aggregate amount of transactions, largest amount of transaction, average amount per transaction, types of transactions, the number of customers transacting business with the teller, the average number of transactions per customer, the number of transactions with the same customers, number of changes on customer records, number of changes on customer records with the same customer, frequency of changes on customer records, frequency of changes on customer records with the same customer, etc. In one aspect of the present disclosure, a computer system compares the current value of an activity with a reference of the historical values of the same activity. When the current value is larger than a reference of the historical values by a noticeable margin, the person who conducted the activity may have committed fraud. Further investigation can be conducted to determine whether this person has truly committed fraud. The reference comprises an average, a medium, a weighted average, and/or other statistic.

In one aspect of the present disclosure, a computer system compares an employee's activity with the activities of other employees who have the same role in the business. For example, if one teller (or loan officer, etc.) behaves very differently from other tellers (or loan officers, etc.) in the same branch, this teller (or loan officer, etc.) may have conducted some suspicious activities.

In one aspect of the present disclosure, a computer system compares an activity value of a particular employee with a reference of all the activity values for the same activity of all employees who have the same responsibilities as the particular employee. When the activity value of the particular employee noticeably deviates from a reference of all the activity values of all employees with the same responsibilities, the particular employee may have committed fraud. Further investigation can be conducted to determine whether this employee has truly committed fraud. The reference comprises an average, a medium, a weighted average, and/or other statistic.

When one employee is compared with a group of employees, the statistical approach used in the flight attendant example described earlier can be applied. For example, a comprehensive set of risk factors associated with employees can be identified and a risk score is assigned to each risk factor. As a result, each employee has a total risk score that is obtained from a mathematical transformation (e.g., summation) of all risk scores associated with the employee.

The set of risk factors for detecting fraud associated with employees may be different from the set of risk factors to detect other type of suspicious activities, such as money laundering. For example, the risk factors for detecting employee fraud may include job type of the employee, education level of the employee, income level of the employee, length of employment at the current job, performance review records, employment history, duration of each employment in the employment history, reasons for termination of each employment in the employment history, age of the employee, sex of the employee, personal conditions of the employee, family conditions of the employee, family members of the employee, family members' conditions of the employee, friends' conditions of the employees, historical records of the employee, type of work performed, number of transactions performed, amount of transactions performed, largest amount of transaction, number of transactions with a particular counter party, amount of transactions with a particular counter party, number of changes of crucial records, number of changes of crucial records associated with a particular counter party, geographical area of the employee's home, geographical area of the employee's office, country of the address of the employee, nationality, type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, numerous risk factors may be considered to determine the employee fraud risk. In one aspect of the present disclosure, different sets of risk factors may be used to detect different types of suspicious activities.

In one aspect of the present disclosure, when the total risk score of a particular employee is higher than the mean of total risk scores of all employees having the same risk factor as the particular employee by a noticeable margin, this particular employee may have conducted suspicious activities. The noticeable margin can be set in terms of a number of the standard deviation.

Instead of one risk factor, multiple risk factors can be used to improve the accuracy of the detection result. In one aspect of the present disclosure, if the total risk score of a particular employee is higher than the mean of total risk scores of all employees having the same set of risk factors as the particular employee by a noticeable margin, this particular employee may have conducted some suspicious activities. In one example, the noticeable margin is set in terms of a number of the standard deviation.

In fact, by identifying the risk factors associated with a group of entities and properly assigning a risk score to each risk factor, a statistical approach based on the total risk score of each entity for identifying a suspicious activity of a particular entity can be applied to many other situations in addition to money laundering, terrorist financing, and employee fraud.

In one aspect of the present disclosure, many risk factors are associated with a group of entities. Each of the risk factors can be assigned a risk score. Each entity can be given a total risk score based on a mathematical transformation, such as a summation. For example, other possible mathematical transformations include, but are not limited to multiplication, division, subtraction, summation of squares, square of summation, a mix of the above, and other like ways of combining risk scores.

In one aspect of the present disclosure, when the total risk score of a particular entity is higher than the mean of total risk scores of all entities having the same risk factor as the particular entity by a predefined margin, this particular entity may have conducted some suspicious activities. The predefined margin can be set in terms of a number of the standard deviation.

In another aspect of the present disclosure, if the total risk score of a particular entity is higher than the mean of total risk scores of all entities having the same set of risk factors as the particular entity by a predefined margin, this particular entity may have conducted some suspicious activities In one aspect of the present disclosure, a computer system identifies one transaction (or a group of transactions) that has caused the particular entity to have a total risk score that is higher than the mean of total risk scores of all entities. Such a transaction (or a group of transactions) may be a suspicious activity.

The noted statistical approach is just one way of managing risks. Many other group comparison methods can also be used. Furthermore, suspicious activities may not be limited to illegal or prohibited activities. An activity becomes suspicious because it is different from normal activities. It may be harmless or even possibly an activity with good intentions. Therefore, investigation is often required to make the final determination of whether to report the detected case.

In one aspect of the present disclosure, a responsible person investigates a newly detected case to determine whether it is a true crime. The responsible person also reviews all historical cases associated with the suspect(s) of the newly detected case. When the responsible person agrees that the detected case is a possible crime, the computer system assists the responsible person to report the detected case. When the responsible person decides not to report the detected case, the responsible person enters a reason into the computer system to justify his/her decision for not reporting the detected case.

After the 9/11 tragedy, the U.S. congress passed the Unlawful Internet Gambling Enforcement Act (UIGEA) because online gambling can be a vehicle for conducting money laundering and terrorist financing activities. Regulation GG was established in response to the Unlawful Internet Gambling Enforcement Act. According to Regulation GG, a financial institution needs to ask questions during the account opening process as to whether a new customer will conduct any online gambling activity. Because perpetrators know online gambling is illegal, however, they will lie during the account opening process. As a result, the "question asking" approach defined in Regulation GG is simply a formality. However, Regulation GG has specifically stated that Regulation GG does not modify the obligation of a financial institution to file a SAR under the Bank Secrecy Act.

In other words, if a perpetrator lied during the account opening process and actually conducts an illegal online gambling business, the financial institution has the obligation to report the case to FinCEN through a SAR. In fact, a number of financial institutions have already failed to detect and report these perpetrators that provided false information during the account opening process. In one aspect of the present disclosure, a computer system compares the senders and recipients of all funds transfer transactions during a period of time. If a customer has sent a large amount of money to a recipient and has also received a large amount of money from the same recipient during a period of time, such transactions may possible be deposits of wager funds and payments for money earned from gambling activities between an online gambler and an online gambling organization. The computer system detects such cases as possible illegal online gambling cases. Once a case is detected, further investigation is required.

In one aspect of the present disclosure, a computer system detects a customer as a possible online gambling organization when the computer system detects a large number of transactions with large dollar amounts associated with the customer because an online gambling organization typically deals with a large amount of money and a large number of clients. The computer system detects such a case as a possible illegal online gambling case. Once a case is detected, further investigation is required.

In one aspect of the present disclosure, a computer system compares a list of known names of online gambling organizations with the senders and the recipients of funds transfer transactions associated with a customer. If there is a match, the customer may be involved in online gambling activities. The computer system detects this case as a possible illegal online gambling case. Once a case is detected, further investigation is required.

In addition to the noted transactional pattern monitoring, group comparison methods described earlier can also be applied to detect possible illegal online gambling activities. In one aspect of the present disclosure, all risk factors related to online gambling are identified. For example, these risk factors may include due diligence results of the customer, length of the account history, industry category of the customer, business type of the customer, number of name matches with gambling organizations in transactions, geographical area of the customer, country of the head office of the customer, nature of the business of the customer, product types of the business, services types of the business, structure of the business, profession of the customer, nationality, historical records, type of the transaction conducted, balance of the accounts, funds inflow, funds outflow, transactional pattern, number of transactions, amount of transactions, transactional volume, transactional frequency, transactional derivative, number of charge backs, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, many different risk factors may be considered to determine online gambling risk. As explained earlier in this disclosure, adjusted risk factors can also be used so that adjusted risk scores can be applied based on the size of operations.

In one aspect of the present disclosure, a risk factor is used to identify a group of customers that have the same risk factor. When a particular customer has a total risk score higher than a reference of the total risk scores of all customers with the same risk factor, the particular customer may be involved in illegal online gambling. In another aspect of the present disclosure, a set of risk factors is used to identify a group of customers who have this set of risk factors. If a particular customer has a total risk score higher than a reference of the total risk scores of all customers with the same set of risk factors, the particular customer may be involved in illegal online gambling. The reference comprises an average, a medium, a weighted average, and/or other statistic. For easy comparison, group statistic such as mean, variance, standard deviation, etc. can be derived to facilitate the comparison among a group of customers.

In one aspect of the present disclosure, a responsible person (or the BSA Officer) investigates the detected case to determine whether it is a true online gambling case. The BSA Officer also reviews all historical cases associated with the suspect of the newly detected case. When the BSA Officer agrees that the detected case is a possible illegal online gambling case, the computer system assists the BSA Officer in filing a SAR to the FinCEN. When the BSA Officer decides not to file a SAR, the BSA Officer enters a reason into the computer system to justify his decision for not reporting the detected case.

The U.S. congress has passed the Fair and Accurate Credit Transactions Act (FACT Act) to protect consumers. In particular, businesses are expected to identify and report identity theft cases. Financial institutions are also expected to file a SAR when identity theft cases are detected.

In one aspect of the present disclosure, a computer system monitors consumer reports and other available information to detect a fraud or active duty alert that is included in a consumer report, a notice of a credit freeze, and/or a notice of an address discrepancy. If a suspicious activity case is detected, the computer system makes the detected case available for a responsible person to review.

In one aspect of the present disclosure, a computer system monitors consumer reports and available information to detect a consumer report indicating a pattern of activity that is inconsistent with the history and usual pattern of activity of an applicant or customer. For example, a recent and significant increase in the volume of inquiries, an unusual number of recently established credit relationships, a material change in the use of credit, especially with respect to recently established credit relationships, or an account that was closed for cause or identified for abuse of account privileges by a financial institution or creditor may represent an unusual pattern. If a suspicious activity case is detected, the computer system makes the detected case available for a responsible person to review.

In one aspect of the present disclosure, a computer system detects whether documents provided for identification appear to have been altered or forged. If a suspicious activity case is detected, the computer system makes the detected case available for a responsible person to review.

In one aspect of the present disclosure, a computer system detects whether the photograph or physical description on the identification is not consistent with the appearance of the applicant or customer presenting the identification. If a suspicious activity case is detected, the computer system makes the detected case available for a responsible person to review.

In one aspect of the present disclosure, a computer system detects whether other information on the identification is not consistent with information provided by the person opening a new account or customer presenting the identification. If a suspicious activity case is detected, the computer system makes the detected case available for a responsible person to review.

In one aspect of the present disclosure, a computer system detects whether other information on the identification is not consistent with readily accessible information that is on file with the financial institution or creditor, such as a signature card or a recent check. If a suspicious activity case is detected, the computer system makes the detected case available for a responsible person to review.

In one aspect of the present disclosure, a computer system detects whether an application appears to have been altered or forged, or gives the appearance of having been destroyed and reassembled. If a suspicious activity case is detected, the computer system makes the detected case available for a responsible person to review.

In one aspect of the present disclosure, a computer system determines whether personal identifying information provided is inconsistent when compared against external information sources used by the financial institution or creditor. For example, the address may not match any address in the consumer report, or the Social Security Number (SSN) has not been issued, or is listed on the Social Security Administration's Death Master File. If a suspicious activity case is detected, the computer system makes the detected case available for a responsible person to review.

In one aspect of the present disclosure, a computer system determines whether personal identifying information provided by the customer is not consistent with other personal identifying information provided by the customer. For example, there may be a lack of correlation between the SSN range and date of birth. If a suspicious activity case is detected, the computer system makes the detected case available for a responsible person to review.

In one aspect of the present disclosure, a computer system determines whether personal identifying information provided is associated with known fraudulent activity as indicated by internal or third-party sources used by the financial institution or creditor. For example: the address on an application may be the same as the address provided on a fraudulent application; or the phone number on an application may be the same as the number provided on a fraudulent application. If a suspicious activity case is detected, the computer system makes the detected case available for a responsible person to review.

In one aspect of the present disclosure, a computer system determines whether personal identifying information provided is of a type commonly associated with fraudulent activity as indicated by internal or third-party sources used by the financial institution or creditor. For example: the address on an application may be fictitious, a mail drop, or a prison; or the phone number may be invalid, or associated with a pager or answering service. If a suspicious activity case is detected, the computer system makes the detected case available for a responsible person to review.

In one aspect of the present disclosure, a computer system determines whether the Social Security Number provided is the same as that submitted by other persons opening an account or other customers. If a suspicious activity case is detected, the computer system makes the detected case available for a responsible person to review.

In one aspect of the present disclosure, a computer system determines whether the address or telephone number provided is the same as or similar to the account number or telephone number submitted by an unusually large number of other persons opening accounts or other customers. If a suspicious activity case is detected, the computer system makes the detected case available for a responsible person to review.

In one aspect of the present disclosure, a computer system determines whether the person opening the account or the customer fails to provide all required personal identifying information on an application or in response to notification that the application is incomplete. If a suspicious activity case is detected, the computer system makes the detected case available for a responsible person to review.

In one aspect of the present disclosure, a computer system determines whether personal identifying information provided is not consistent with personal identifying information that is on file with the financial institution or creditor. If a suspicious activity case is detected, the computer system makes the detected case available for a responsible person to review.

In one aspect of the present disclosure, a computer system determines whether the person opening the account or the customer cannot provide authenticating information such as answers to challenge questions which are beyond that which generally would be available from a wallet or consumer report. If a suspicious activity case is detected, the computer system makes the detected case available for a responsible person to review.

In one aspect of the present disclosure, a computer system determines whether there is unusual use of, or suspicious activity related to, the account. If a suspicious activity case is detected, the computer system makes the detected case available for a responsible person to review.

In one aspect of the present disclosure, a computer system determines whether, shortly following the notice of a change of address for an account, the institution or creditor receives a request for a new, additional, or replacement card or a cell phone, or for the addition of authorized users on the account. If a suspicious activity case is detected, the computer system makes the detected case available for a responsible person to review.

In one aspect of the present disclosure, a computer system determines whether a new revolving credit account is used in a manner commonly associated with known patterns of fraud. For example: the majority of available credit is used for cash advances or merchandise that is easily convertible to cash (e.g., electronics equipment or jewelry); or the customer fails to make the first payment or makes an initial payment but no subsequent payments. If a suspicious activity case is detected, the computer system makes the detected case available for a responsible person to review.

In one aspect of the present disclosure, a computer system determines whether an account is used in a manner that is not consistent with established patterns of activity on the account. There is, for example: nonpayment when there is no history of late or missed payments, a material increase in the use of available credit, a material change in purchasing or spending patterns, a material change in electronic fund transfer patterns in connection with a deposit account; or a material change in telephone call patterns in connection with a cellular phone account. If a suspicious activity case is detected, the computer system makes the detected case available for a responsible person to review.

In one aspect of the present disclosure, a computer system determines whether an account that has been inactive for a reasonably lengthy period of time is used (taking into consideration the type of account, the expected pattern of usage and other relevant factors). If a suspicious activity case is detected, the computer system makes the detected case available for a responsible person to review.

In one aspect of the present disclosure, a computer system determines whether mail sent to the customer is returned repeatedly as undeliverable although transactions continue to be conducted in connection with the customer's account. If a suspicious activity case is detected, the computer system makes the detected case available for a responsible person to review.

In one aspect of the present disclosure, a computer system determines whether the financial institution or creditor is notified that the customer is not receiving paper account statements. If a suspicious activity case is detected, the computer system makes the detected case available for a responsible person to review.

In one aspect of the present disclosure, a computer system determines whether the financial institution or creditor is notified of unauthorized charges or transactions in connection with a customer's account. If a suspicious activity case is detected, the computer system makes the detected case available for a responsible person to review.

In one aspect of the present disclosure, a computer system determines whether the financial institution or creditor is notified by a customer, a victim of identity theft, a law enforcement authority, or any other person that it has opened a fraudulent account for a person engaged in identity theft. If a suspicious activity case is detected, the computer system makes the detected case available for a responsible person to review.

In addition to monitoring transactional patterns as described above, group comparison methods described earlier can also be applied to detect possible identity theft cases.

Identity theft cases can be classified into two primary categories. The first category includes cases in which a victim's account, financial instrument, or identification document is stolen by a fraudster to conduct activities. Under such circumstances, as described earlier, a computer system can detect activities that deviate from the expected activities of the victim which can be established from the historical activities of the victim.

The second category includes cases in which a victim's identity is stolen to open a new account and/or start some new activities. Under such circumstances, the victim is out of the picture from day one. Because there is no true historical activity of the victim, the expected activities of the victim cannot be correctly established for fraud prevention purposes. Although somebody can ask the perpetrator some questions and collect answers during the account opening process with the intention of establishing expected activities of the perpetrator, this question-and-answer approach may not work because the perpetrator knows how to answer questions for establishing his expected activities without triggering any alert.

To detect identity theft when there is no true historical activity available, in one aspect of the present disclosure, all risk factors of a new account or new customer are identified. For example, these risk factors may include due diligence results of the customer, prior records of the customer with other businesses, credit report records of the customer, industry category of the customer, business type of the customer, geographical area of the customer, country of the address of the customer, nature of the business of the customer, product types of the business, services types of the business, structure of the business, profession of the customer, nationality, historical records, type of the transaction conducted, balance of the accounts, funds inflow, funds outflow, transactional pattern, number of transactions, amount of transactions, transactional volume, transactional frequency, transactional derivative, number of charge backs, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, numerous risk factors may be considered to determine the identity theft risk.

In one aspect of the present disclosure, a risk factor is used to identify a group of persons who have the same risk factor. If a particular person has a total risk score which is much higher than a reference of the total risk scores of all persons who have the same risk factor, the particular person may be involved in an identity theft case. A set of risk factors can be used to identify a group of persons who have this set of risk factors. If a particular person has a total risk score higher than a reference of the total risk scores of all persons with the same set of risk factors, the particular person may be involved in an identity theft case. The reference comprises an average, a medium, a weighted average, and/or other statistic. For easy comparison, group statistic such as mean, variance, standard deviation, etc. can be derived to facilitate such comparison among a group of persons.

In one aspect of the present disclosure, a responsible person (or the Compliance Officer) investigates the detected case to determine whether it is a true identity theft case. The Compliance Officer also reviews all historical cases associated with the newly detected case. If the Compliance Officer agrees that the case is a possible identity theft case, the computer system assists the Compliance Officer to file a SAR with the FinCEN. If the Compliance Officer decides not to file a SAR, the Compliance Officer enters a reason into the computer system to justify his decision for not reporting the detected activities.

The Office of Foreign Assets Control (OFAC) has a very simple rule stating that it is illegal to have any business transaction with any entity on the list published by the Office of Foreign Assets Control. This list is commonly referred to as the "OFAC List." This rule applies to all U.S. persons and entities, including financial institutions. For example, Wal-Mart was fined by the OFAC for a violation of this rule. U.S. financial institutions that are under the tightest regulatory monitoring naturally must strictly comply with this rule.

In the beginning, it was a very simple rule. The implications of this rule, however, have become much more complicated over the past 10 years. A common issue occurs when people misspell (including mistype, mispronounce, etc.) their names. Even if an entity's name was misspelled but is on the OFAC List, a financial institution still has the obligation of identifying this entity as an entity on the OFAC List (generally referred to as an OFAC match).

The natural question is how much deviation from the original names on the OFAC List is classified as "misspelling." The OFAC and government regulators have never given any precise guidance for answering this question. A very common exercise an examiner or auditor may perform is the use a notorious name like "Osama bin Laden" as a sample to test a business. In general, a business is supposed to identify all business transaction associated with "Osama bin Laden," "Osama Laden," "Osama Laten," "Laten Osama," "Latin Obama," etc. as possible OFAC matches. Now, if the scope of deviation from the OFAC names is further broadened, whether a financial institution is supposed to identify a single word "Obama" which is the current U.S. president's name as a possible OFAC match is questionable. One can easily tell that such a simple OFAC rule has created a great deal of confusions in recent years.

In one aspect of the present disclosure, an "OFAC Match Scale" is used to measure the degree of deviation. A value referred to as "Relative Correlation" ("RC value") may be produced by the OFAC Match Scale to measure the similarity between two names. For example, if a name has an RC value of 100%, it exactly matches an OFAC name on the OFAC list. If a name has an RC value of 97%, it may be different from an OFAC name on the OFAC list by one letter or two letters. If a name has an RC value of 0%, it is totally different from all OFAC names on the OFAC list.

In one aspect of the present disclosure, the length of the name also affects the RC value. For example, if a name is different by one letter from an OFAC name which has 25 letters, the RC value may be 96%, while another name may have an RC value of 90% although it is also different by just one letter from another OFAC name, which has 10 letters.

Some long words, such as international, incorporation, limited, company, organization, etc., are commonly used for business names, and such words also exist in the OFAC names list. As a result, these long words produce higher RC values for those businesses that use these long words in their names. To avoid unnecessary false positives, in one aspect of the present disclosure, a commonly-used long word may be replaced with a short word to reduce its impact on the RC value. For example, the word "international" can be replaced with "intl."

In addition, some countries do not use the descriptions "first name" and "last name." As a result, a person may use a different sequence of names when this person is asked to provide a first name and a last name. "Osama Laden" may become "Laden Osama." In one aspect of the present disclosure, an OFAC match scale identifies a possible "off-sequence" OFAC match.

Moreover, some words are commonly used in certain cultures without contributing distinct differentiations. For example, "bin" means "son of" and "binti" means "daughter of" in Muslim cultures. Official names in Muslim culture have either "bin" or "binti" in the name. For example, if a Muslim father has the name "John," his daughter "Mary" will have an official name of "Mary binti John" and his son "David" will have an official name "David bin John." Under such circumstances, the words "bin" and "binti", which are commonly used in Muslin names, will create "false similarity" between two Muslim names. To provide a more scientifically correct result, in one aspect of the present disclosure, the OFAC match scale may exclude these kinds of "trivial words" before the calculation of the RC value. Sometimes, a name may be translated into English based on sound. Therefore, in one aspect of the present disclosure, the OFAC match scale should measure the match of sound to determine the RC value.

In one aspect of the present disclosure, a financial institution decides what threshold to use when it conducts an OFAC check. For example, if a financial institution uses a threshold of 75%, a possible OFAC match is detected when a name has an RC value of 75% or higher. Because each financial institution may have a different risk exposure from others, it is very likely that X is the best threshold for financial institution A while Y is the best threshold for financial institution B. As a general guideline, the X or Y value is selected in accordance with a risk-based principle.

In general, the higher threshold a financial institution uses, the fewer possible OFAC matches the financial institution detects. This saves time during the review process because more false positives are avoided. If the threshold is too high, however, it is possible that the financial institution may miss a reasonable deviation from an OFAC name, such as "Osama bin Laden." If the threshold is too low, it is possible that the financial institution may falsely detect many of its clients as possible OFAC matches. The best practice is to find a tradeoff between "too many possible OFAC matches to review" and "missing real OFAC name deviations caused by misspellings."

In one aspect of the present disclosure, a user can randomly select a number of OFAC names from the OFAC List and find out how the OFAC match scale responds to deviations from these selected OFAC names. A user can then determine when he calls a "possible OFAC match" based on this test. It is advisable to keep this test result for future auditors and examiners to review.

There is a possibility that a particular name is very close to an OFAC name. For example, American Express, a very reputable credit card company, is often falsely detected as an OFAC match because of the word "express." Therefore, to avoid this type of frequent false positive, in one aspect of the present disclosure, an exempt list is produced by users to include those well-known reputable businesses on the exempt list. The businesses on the exempt list are classified as false positives, either automatically by the computer or manually by users, when they are detected as possible OFAC matches.

Very often, a business may have an OFAC officer that handles all OFAC related matters. In one aspect of the present disclosure, if an OFAC Officer (i.e., a responsible person) of a financial institution detects a possible OFAC match with an RC value over a pre-defined threshold, the OFAC Officer investigates whether this is a true OFAC match. If the OFAC Officer believes that it is a true match, the OFAC Officer should handle the case according to the guidelines issued by the Office of Foreign Assets Control. According to the OFAC regulations, in some cases, the OFAC Officer may need to block the transaction so that the person on the OFAC list does not benefit from the transaction. If the OFAC Officer decides that the OFAC match is a false positive after his investigation, the OFAC Officer should enter a reason into the computer system to justify his reason for not reporting such OFAC match case to the Office of Foreign Assets Control and/or not block the transaction.

Section 314(a) of the USA PATRIOT Act requires financial institutions to detect matches of names on a 314(a) list which is periodically published by the FinCEN. The computer system can handle the 314(a) compliance matters using a similar approach to the handling of the OFAC compliance matters, as described above.

Sometimes, a 314(a) list also includes additional personal identification information, such as identification document number, date of birth, address, etc. In one aspect of the present disclosure, in addition to the methods described above for detecting possible OFAC matches, personal identification information, such as identification document number, address, and/or date of birth, etc. is used by the computer system to determine whether a detected 314(a) match is a true match. This approach can reduce false positives in the 314(a) matching process.

In one aspect of the present disclosure, if a Compliance Officer (i.e., a responsible person) of a financial institution detects a possible 314(a) match with an RC value over a pre-defined threshold, the Compliance Officer investigates whether this is a true 314(a) match. In one aspect of the present disclosure, if the Compliance Officer believes it is a true match, the Compliance Officer reports the 314(a) match case to the FinCEN. If the Compliance Officer decides that the 314(a) match is a false positive after his investigation, the Compliance Officer enters a reason into the computer system to justify his reason for not reporting the 314(a) match to the FinCEN.

In one aspect of the present disclosure, the computer system receives customer information and transactional data from the core data processing system of the financial institution. The computer system receives customer information and transactional data from other data processing systems that may be inside or outside the financial institution.

In one aspect of the present disclosure, the computer system receives information regarding suspicious activities observed by frontline personnel. The computer system may receive information input by the frontline personnel. The computer system may also receive information provided by other internal or external sources.

Although "financial institutions" are used as examples for easy explanation, the present disclosure also applies to other types of businesses. In general, any business that needs to comply with laws and regulations may employ a transactional monitoring system as described in the present disclosure.

As contemplated in the described aspects, one of many possible combinations is described below as an example. A computer system for transaction monitoring 500 and a computer network 600, such as a local area network, enable a BSA Officer 100, Compliance Officer 200, Security Officer 300 and Other Responsible Person 400 to comply with different types of laws and regulations as shown in FIG. 1.

Figure 2:
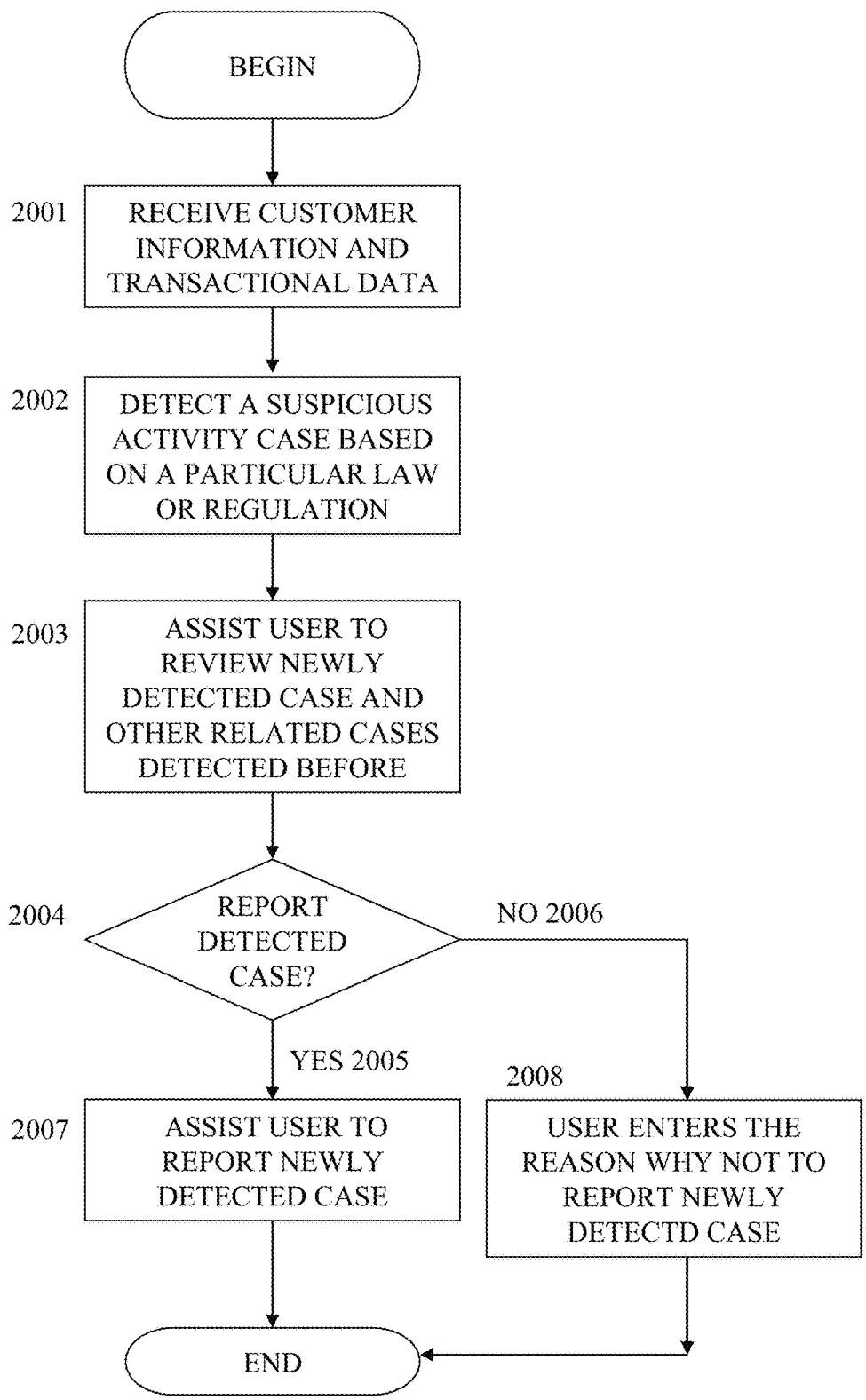
FIG. 2 is a flowchart of an example process, indicating how a BSA Officer, Compliance Officer, Security Officer or another responsible person detects and reports a suspicious activity case by using the computer system shown in FIG. 1.

As shown in the flowchart of FIG. 2 in combination with the system diagram of FIG. 1, each person can use the computer system 500 to detect suspicious activities and report the detected suspicious activities according to applicable laws and regulations. These laws and regulations at least include the USA PATRIOT Act, the Bank Secrecy Act (BSA), the Fair and Accurate Credit Transactions Act (FACT Act), the Unlawful Internet Gambling Enforcement Act (UIGEA), the Elder Abuse Reporting Act, (EARA), the Sarbanes-Oxley Act (SOX), the regulations set by the Office of Foreign Assets Control (OFAC), the regulations set by the Financial Crimes Enforcement Network (FinCEN), and other laws and regulations.

First (block 2001), the computer system 500 receives customer information and transactional data from a core data processing system and/or other systems of a business. Based on the customer information and the transactional data (block 2002), the computer system 500 detects a new suspicious activity case by using at least one of the suspicious activities detection methodologies described in the present disclosure.

Furthermore (block 2003), the computer system 500 assists a user (i.e., BSA Officer 100, Compliance Officer 200, Security Officer 300 and/or other responsible person 400) to review the newly detected suspicious activity case through the network 600. The computer system 500 also assists the user to review other related cases that were previously detected by the computer system 500. This review process helps the user make a better judgment about whether the newly detected case is truly a suspicious activity case.

The user makes a decision of whether to report the newly detected case (decision block 2004). If the user decides to report the newly detected case (YES branch 2005), the computer system 500 assists the user in reporting the detected case (block 2007). If the user decides not to report the newly detected case (NO branch 2006), the computer system 500 permits the user to enter a reason to justify his decision not to report the newly detected case (block 2008). The reason and the newly detected case are stored in a database for future reference. As explained earlier, a case that is not reported as a suspicious activity case today may become a part of a real suspicious activity case in the future as more evidence become available.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit and scope of this disclosure. Such alterations and changes should not be construed as deviations from the present disclosure.

What is claimed is:

1. A computer-implemented method for monitoring customer activity to detect suspicious activity, comprising:
   receiving, at a first computer system, an input identifying a customer type and a suspicious activity type indicating a type of the suspicious activity to be detected by the computer system;
   selecting, by the first computer system, a set of risk factors for determining a first total risk score for a customer, the set of risk factors selected from a plurality of risk factors based on the customer type and the suspicious activity type;
   determining, by the first computer system, the first total risk score for the customer associated with the customer type based on a summation of risk values associated with the set of risk factors;
   adjusting, by the first computer system, a monitoring level for determining an amount of transactional data to monitor based on the first total risk score;
   monitoring, by the first computer system according to the adjusted monitoring level, the transactional data comprising a plurality of transactions between the customer and a first financial institution associated with a second computer system, at least one transaction of the plurality of transactions comprising an electronic transaction;
   filtering, by the first computer system, the transactional data based on the set of risk factors;

updating, by the first computer system, the risk value of each risk factor based at least in part on background data of the customer and the filtered transactional data;

generating, by the first computer system, a second total risk score for the customer via a summation of the updated risk values associated with the risk factors of the customer;

detecting, by the first computer system, the suspicious activity when the second total risk score of the customer is greater than a mean total risk score of each customer associated with the customer type and the suspicious activity type;

transmitting, from the first computer system to a third computer system, at least a portion of the filtered transactional data in response to detecting the suspicious activity; and transmitting, from the first computer system to a fourth computer system in response to an instruction received from the third computer, a report associating the customer with the suspicious activity type, the report used for further investigation of the customer.

2. The computer-implemented method of claim 1, in which the background data is associated with at least one of an industry category of the customer, a business type of the customer, a geographical area of the customer, a country of an address of the customer, a nature of a business of the customer, a product type of the business, a services type of the business, a structure of the business, a profession of the customer, a nationality of the customer, a historical record, a type of the transaction conducted, a balance of an account, funds inflow, funds outflow, a transactional pattern, a number of transactions, an amount of transactions, a transactional volume, a transactional frequency, a transactional derivative, a location of the transaction, a time of the transaction, a country of the transaction, a sender of a money transfer transaction, a location of the sender, a country of the sender, a nature of the sender, a recipient of a money transfer transaction, a location of the recipient, a country of the recipient, a nature of the recipient, a relationship, social status, political exposure, a historical transaction, a number of suspicious activity reports (SARs) filed for money laundering and terrorist financing cases, a category of the first financial institution, a business type of the first financial institution, geographical area of the first financial institution, country of a head office of the first financial institution, nature of the business of the first financial institution, age of a person, sex of the person, income level of the person, appearance of the person, judgment about the person, a personal condition of the person, a family condition of the person, a family member of the person, a family member's condition of the person, a friend of the person, a friend's condition of the person, a historical record of the person, an industry category of the person, a geographical area of the person, a country of an address of the person, a profession of the person, a job type of an employee, an education level of an employee, an income level of an employee, a length of employment at a current job, a performance review record, employment history, a duration of each employment in the employment history, a reason for termination of each employment in the employment history, an age of the employee, a sex of the employee, a personal condition of the employee, a family condition of the employee, a family member of the employee, a family member's condition of the employee, a friend's condition of the employee, a historical record of the employee, a type of work performed, a number of transactions performed, an amount of transactions performed, a largest amount of transaction, a number of transactions with a particular counter party, an amount of transactions with a particular counter party, a number of changes of a crucial record, a number of changes of a crucial record associated with a particular counter party, a geographical area of an employee's home, a geographical area of an employee's office, a country of the address of the employee, a due diligence result of the customer, a length of an account history, a number of name matches with gambling organizations in transactions, or a combination thereof.

3. The computer-implemented method of claim 1, in which the transactional data is associated with at least one of cash, check, wire transfer, ATM (Automated Teller Machine), ACH (Automated Clearing House), credit card, debit card, prepaid card, electronic fund transfer, account opening, account closure, an account application, deposit, withdrawal, cancellation, balance check, inquiry, credit, debit, or a combination thereof.

4. The computer-implemented method of claim 1, in which the transactional data of the customer comprises terrorist financing activity when the predefined set of risk factors is associated with terrorist financing.

5. The computer-implemented method of claim 1, in which the transactional data of the customer comprises money laundering activity when the predefined set of risk factors is associated with money laundering.

6. The computer-implemented method of claim 1, in which the transactional data of the customer comprises fraudulent activity when the predefined set of risk factors is associated with fraud.

7. The computer-implemented method of claim 1, in which the transactional data of the customer comprises an elder abuse activity when the predefined set of risk factors is associated with elder abuse.

8. The computer-implemented method of claim 1, in which the transactional data of the customer comprises unlawful internet gambling activity when the predefined set of risk factors is associated with unlawful internet gambling.

9. The computer-implemented method of claim 1, in which the transactional data of the customer comprises identity theft activity when the predefined set of risk factors is associated with identity theft.

10. The computer-implemented method of claim 1, in which the report comprises a Suspicious Activity Report (SAR).

11. The computer-implemented method of claim 1, in which the second computer system resides at the first financial institution.

12. The computer-implemented method of claim 11, in which the first financial institution comprises at least one of a bank, credit union, money services business, financial holding company, insurance company, insurance agency, mortgage company, mortgage agency, stockbroker, stock agency, bond broker, bond agency, commodity broker, commodity agency, trading company, trading agency, other financial service provider, other financial agency, stock exchange, commodity exchange, currency exchange, bond exchange, other exchange, funds manager, investment company, private equity firm, venture capital firm, virtual currency company, merchant acquirer, payment processor, payment card issuer, payment card program manager, internet merchant, other organization related to financial services, or a combination thereof.

13. The computer-implemented method of claim 1, in which the third computer system resides at a second financial institution.

14. The computer-implemented method of claim 13, in which the second financial institution comprises at least one of a bank, credit union, money services business, financial holding company, insurance company, insurance agency, mortgage company, mortgage agency, stockbroker, stock agency, bond broker, bond agency, commodity broker, commodity agency, trading company, trading agency, other financial service provider, other financial agency, stock exchange, commodity exchange, currency exchange, bond exchange, other exchange, funds manager, investment company, private equity firm, venture capital firm, virtual currency company, merchant acquirer, payment processor, payment card issuer, payment card program manager, internet merchant, other organization related to financial services, or a combination thereof.

15. The computer-implemented method of claim 1, in which the fourth computer system resides at a government organization.

16. The computer-implemented method of claim 15, in which the government organization comprises a Financial Crimes Enforcement Network (FinCEN).

17. The computer-implemented method of claim 1, in which the customer is associated with at least one of an individual, an organization, or a combination thereof.

* * * * *